United States Patent
Tsukagoshi

(10) Patent No.: US 11,736,732 B2
(45) Date of Patent: Aug. 22, 2023

(54) TRANSMISSION DEVICE, TRANSMISSION METHOD, RECEPTION DE-VICE, AND RECEPTION METHOD

(71) Applicant: SATURN LICENSING LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/531,620

(22) Filed: Nov. 19, 2021

(65) Prior Publication Data

US 2022/0086500 A1 Mar. 17, 2022

Related U.S. Application Data

(63) Continuation of application No. 16/629,993, filed as application No. PCT/JP2018/026828 on Jul. 18, 2018, now Pat. No. 11,245,929.

(30) Foreign Application Priority Data

Jul. 20, 2017 (JP) ................. 2017-140592

(51) Int. Cl.
*H04N 19/30* (2014.01)
*H04N 19/70* (2014.01)
(Continued)

(52) U.S. Cl.
CPC ............ *H04N 19/70* (2014.11); *H04H 20/28* (2013.01); *H04H 60/13* (2013.01);
(Continued)

(58) Field of Classification Search
CPC ...... H04N 19/70; H04N 19/172; H04N 19/30; H04N 19/46; H04H 20/28; H04H 60/13
See application file for complete search history.

(56) References Cited

U.S. PATENT DOCUMENTS

2009/0094024 A1* 4/2009 Yamanashi ............ G10L 19/24
  704/219
2012/0307006 A1 12/2012 Tsukagoshi
(Continued)

FOREIGN PATENT DOCUMENTS

CN 101558652 A 10/2009
CN 101878649 A 11/2010
(Continued)

OTHER PUBLICATIONS

Extended European Search Report dated Apr. 29, 2020 in corresponding European Patent Application No. 18836116.6, 8 pages.
(Continued)

*Primary Examiner* — Hesham K Abouzahra
(74) *Attorney, Agent, or Firm* — Jeffery J. Brosemer

(57) ABSTRACT

The reception side can easily acquire at least function enhancement information inside a codec.
Image data of each picture of a base layer is encoded to generate a first encoded stream, and image data of each picture of an enhanced layer is encoded to generate a second encoded stream. The first encoded stream and the second encoded stream are transmitted. Function enhancement information including at least function enhancement information inside a codec is transmitted outside the encoded stream. For example, the function enhancement information further includes function enhancement information outside the codec.

12 Claims, 30 Drawing Sheets

(51) Int. Cl.
*H04N 19/172* (2014.01)
*H04N 19/46* (2014.01)
*H04H 20/28* (2008.01)
*H04H 60/13* (2008.01)

(52) U.S. Cl.
CPC .......... *H04N 19/172* (2014.11); *H04N 19/30* (2014.11); *H04N 19/46* (2014.11)

(56) References Cited

U.S. PATENT DOCUMENTS

| | | |
|---|---|---|
| 2016/0165243 A1 | 6/2016 | Nakagami |
| 2016/0295220 A1* | 10/2016 | Oh .................... H04N 21/4312 |
| 2016/0301959 A1 | 10/2016 | Oh et al. |
| 2016/0345032 A1 | 11/2016 | Tsukagoshi |
| 2017/0018291 A1* | 1/2017 | Yahata .................... H04N 5/84 |
| 2017/0034525 A1* | 2/2017 | Sato .................... H04N 19/503 |
| 2017/0085897 A1 | 3/2017 | Narasimhan |
| 2018/0359507 A1 | 12/2018 | Oh |
| 2019/0297339 A1* | 9/2019 | Hannuksela .......... H04N 19/51 |

FOREIGN PATENT DOCUMENTS

| | | |
|---|---|---|
| CN | 105531999 A | 4/2016 |
| EP | 3 070 934 A1 | 9/2016 |
| EP | 3 073 742 A1 | 9/2016 |
| JP | 2008-543142 A | 11/2008 |
| JP | 2015-126469 A | 7/2015 |
| JP | 2016-005217 A | 1/2016 |
| JP | 2016-063538 A | 4/2016 |
| JP | 2016-541140 A | 12/2016 |
| KR | 20040054816 A | 6/2004 |
| KR | 20060135699 A | 12/2006 |
| KR | 20080036222 A | 4/2008 |
| KR | 20120127409 A | 11/2012 |
| KR | 20140129950 A | 11/2014 |
| WO | WO 2015/118909 A1 | 8/2015 |
| WO | WO 2017/043863 A1 | 3/2017 |

OTHER PUBLICATIONS

International Search Report dated Oct. 16, 2018 in PCT/JP2018/026828 filed Jul. 18, 2018, 2 pages.

Guidelines for Implementation: DASH-IF Interoperability Points; Sep. 7, 2017; DASH Industry Forum, Version 4.1.

Dolby Vision streams within the MPEG-DASH format v1.1; Mar. 25, 2016.

* cited by examiner

| DRCL1_mapping | | data0 | data1 |
|---|---|---|---|
| IN CASE OF SDR -> HDR CONVERSION INTO PQ HDR; | | | |
| | Transfer characteristics | SDR | HDR - PQ |
| | Color gamut | 709 | 2020 |
| IN CASE OF SDR -> HDR CONVERSION INTO HLG HDR; | | | |
| | Transfer characteristics | SDR | HDR - HLG |
| | Color gamut | 709 | 2020 |

(b)

| DRCL2_mapping | | data0 | data1 |
|---|---|---|---|
| IN CASE OF HDR -> SDR CONVERSION FROM PQ HDR; | | | |
| | Transfer characteristics | HDR-PQ | HDR-low(*) |
| | Color gamut | 2020 | 2020 |
| IN CASE OF HDR -> SDR CONVERSION FROM HLG HDR; | | | |
| | Transfer characteristics | HDR - HLG | HDR-low (*) |
| | Color gamut | 2020 | 2020 |

FIG. 9

| Syntax | No. of Bits | Format |
|---|---|---|
| DRCL_mapping() { | | |
| in_transfer_function | 8 | |
| in_color_primaries | 8 | |
| in_matrix_coeffs | 8 | |
| post_conversion_type | 8 | |
| out_transfer_function | 8 | |
| out_color_primaries | 8 | |
| out_matrix_coeffs | 8 | |
| } | | |

FIG. 10

```
DRCL_mapping SEMANTICS in_transfer_function (8bts)    INDICATE NONLINEAR TRANSFER FUNCTION OF ENCODED VIDEO
                                  1    ITU-R Rec. BT.709  CHARACTERISTIC
                                  16   ITU-R Rec. BT.2100 PQ  CHARACTERISTIC
                                  18   ITU-R Rec. BT.2100 HLG  CHARACTERISTIC in_color_primaries (8bts)      INDICATE COLOR PRIMARY OF ENCODED VIDEO
                                  1    ITU-R Rec. BT.709
                                  9    ITU-R Rec. BT.2020 in_matrix_coeffs (8bts)        INDICATE COLOR COMPONENT MATRIX CONVERSION COEFFICIENT OF ENCODED VIDEO
                                  1    COEFFICIENT OF ITU-R Rec. BT.709
                                  9    COEFFICIENT OF ITU-R Rec. BT.2020 NON-CONSTANT BRIGHTNESS SYSTEM post_conversion_type (8bts)    INDICATE TYPE OF CONVERSION METADATA
                                  0    SDR->HDR  CONVERSION METADATA (ETSI TS 103433-1)
                                  1    HDR->Non-HDR CONVERSION METADATA 1 (SMPTE2094-10)
                                  2    HDR->Non-HDR CONVERSION METADATA 2 (SMPTE2094-40)

out_transfer_function (8bts)   INDICATE NON-LINEAR TRANSFER FUNCTION OF VIDEO AFTER POST-PROCESSING CONVERSION
                                  1    ITU-R Rec. BT.709  CHARACTERISTIC
                                  16   ITU-R Rec. BT.2100 PQ  CHARACTERISTIC
                                  18   ITU-R Rec. BT.2100 HLG  CHARACTERISTIC out_color_primaries (8bts)     INDICATE COLOR PRIMARY OF VIDEO AFTER POST-PROCESSING CONVERSION
                                  1    ITU-R Rec. BT.709
                                  9    ITU-R Rec. BT.2020 out_matrix_coeffs (8bts)       INDICATE COLOR COMPONENT MATRIX CONVERSION COEFFICIENT OF VIDEO AFTER
                               POST-PROCESSING CONVERSION
                                  1    COEFFICIENT OF ITU-R Rec. BT.709
                                  9    COEFFICIENT OF AN ITU-R Rec. BT.2020 NON-CONSTANT BRIGHTNESS SYSTEM
```

FIG. 20

```
<Period>
    <AdaptationSet mimeType="video/mp4" codecs="hev1.xx.xx.L153,xx, hev1.yy.yy.L153,yy">
        <Representation>
            <SupplementaryDescriptor schemeIdUri="urn:brdcst:video:codeddynamicrange" value="0"/>
            <SupplementaryDescriptor schemeIdUri="urn:brdcst:video:codedtransferfunction" value="0"/>
            <SupplementaryDescriptor schemeIdUri="urn:brdcst:video:codedxycolourprimaries" value="0"/>
            <width="3840" height="2160" frameRate="60"
            codecs="hev1.xx.xx.L153,xx"
            level="0" />
            <BaseURL>videostreamBase.mp4</BaseURL>
        </Representation>
        <Representation>
            <SupplementaryDescriptor schemeIdUri="urn:brdcst:video:codeddynamicrange" value="1"/>
            <SupplementaryDescriptor schemeIdUri="urn:brdcst:video:codedtransferfunction" value="2"/>
            <SupplementaryDescriptor schemeIdUri="urn:brdcst:video:codedxycolourprimaries" value="1"/>
            <width="3840" height="2160" frameRate="60"
            codecs="hev1.xx.xx.L153,xx"
            level="1"
            dependencyLevel="0" />
            <BaseURL>videostreamEnhanced.mp4</BaseURL>
        </Representation>
    </AdaptationSet>
</Period>
```

MPD

FIG. 21

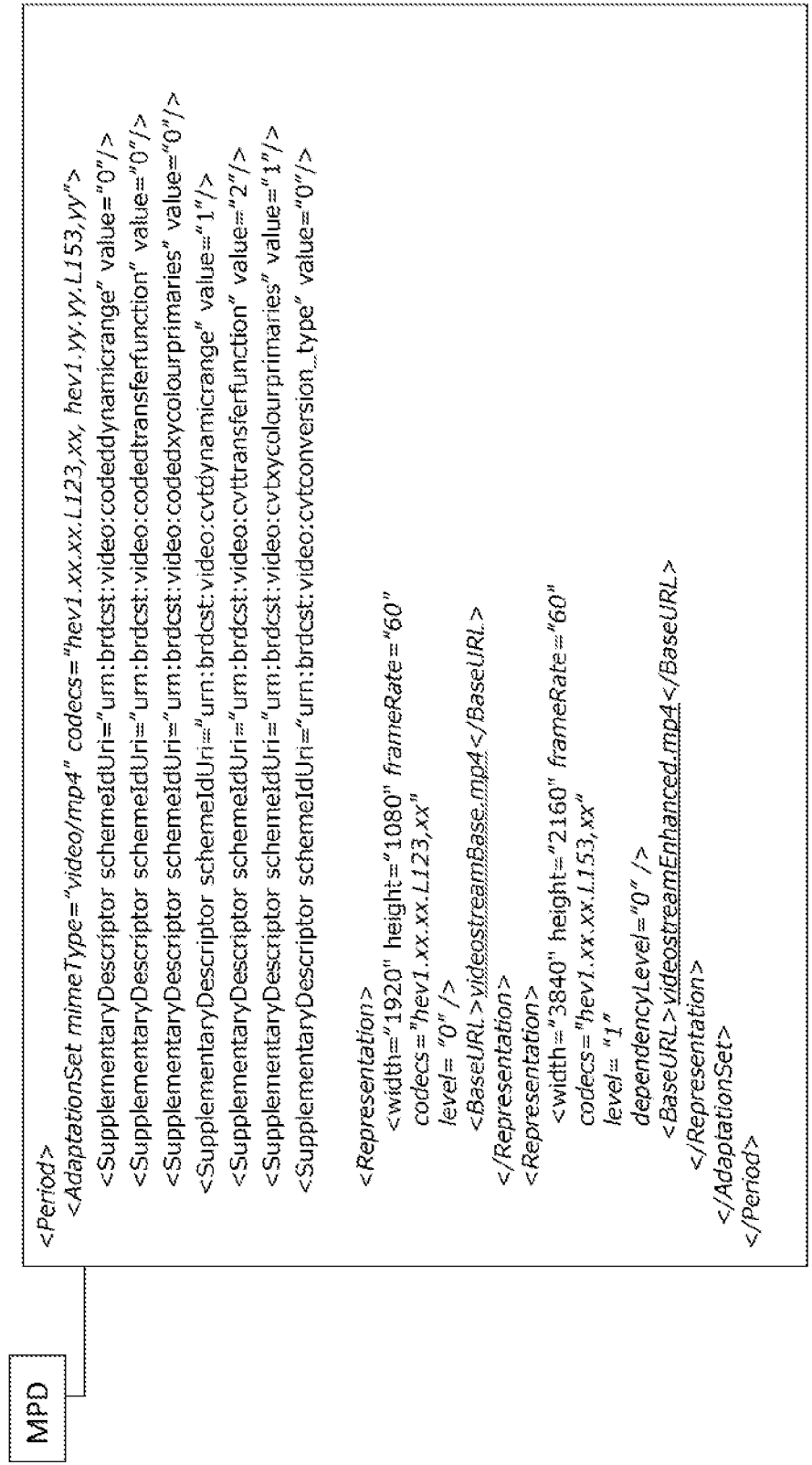

```
<Period>
  <AdaptationSet mimeType="video/mp4" codecs="hev1.xx.xx.L123,xx, hev1.yy.yy.L153,yy">
    <SupplementaryDescriptor schemeIdUri="urn:brdcst:video:codeddynamicrange" value="0"/>
    <SupplementaryDescriptor schemeIdUri="urn:brdcst:video:codedtransferfunction" value="0"/>
    <SupplementaryDescriptor schemeIdUri="urn:brdcst:video:codedxycolourprimaries" value="0"/>
    <SupplementaryDescriptor schemeIdUri="urn:brdcst:video:cvtdynamicrange" value="1"/>
    <SupplementaryDescriptor schemeIdUri="urn:brdcst:video:cvttransferfunction" value="2"/>
    <SupplementaryDescriptor schemeIdUri="urn:brdcst:video:cvtxycolourprimaries" value="1"/>
    <SupplementaryDescriptor schemeIdUri="urn:brdcst:video:cvtconversion_type" value="0"/>

<Representation>
      <width="1920" height="1080" frameRate="60"
      codecs="hev1.xx.xx.L123,xx"
      level="0" />
      <BaseURL>videostreamBase.mp4</BaseURL>
    </Representation>
    <Representation>
      <width="3840" height="2160" frameRate="60"
      codecs="hev1.xx.xx.L153,xx"
      level="1"
      dependencyLevel="0" />
      <BaseURL>videostreamEnhanced.mp4</BaseURL>
    </Representation>
  </AdaptationSet>
</Period>
```

MPD

FIG. 22

```
MPD

<Period>
<AdaptationSet mimeType="video/mp4" codecs="hev1.xx.xx.L123,xx, hev1.yy.yy.L153,yy">
    <Representation>
        <SupplementaryDescriptor schemeIdUri="urn:brdcst:video:codeddynamicrange" value="0"/>
        <SupplementaryDescriptor schemeIdUri="urn:brdcst:video:codedtransferfunction" value="0"/>
        <SupplementaryDescriptor schemeIdUri="urn:brdcst:video:codedxycolourprimaries" value="0"/>

<width="1920" height="1080" frameRate="60"
        codecs="hev1.xx.xx.L123,xx"
        level="0"/>
        <BaseURL>videostreamBase.mp4</BaseURL>
    </Representation>
    <Representation>
        <SupplementaryDescriptor schemeIdUri="urn:brdcst:video:codeddynamicrange" value="1"/>
        <SupplementaryDescriptor schemeIdUri="urn:brdcst:video:codedtransferfunction" value="2"/>
        <SupplementaryDescriptor schemeIdUri="urn:brdcst:video:codedxycolourprimaries" value="1"/>

<width="3840" height="2160" frameRate="60"
        codecs="hev1.xx.xx.L153,xx"
        level="1"
        dependencyLevel="0"/>
        <BaseURL>videostreamEnhanced.mp4</BaseURL>
    </Representation>
</AdaptationSet>
</Period>
```

FIG. 23

```
<Period>
  <AdaptationSet mimeType="video/mp4" codecs="hev1.xx.xx.L153.xx, hev1.yy.yy.L156.yy">
    <SupplementaryDescriptor schemeIdUri="urn:brdcst:video:codeddynamicrange" value="0"/>
    <SupplementaryDescriptor schemeIdUri="urn:brdcst:video:codedtransferfunction" value="0"/>
    <SupplementaryDescriptor schemeIdUri="urn:brdcst:video:codedxycolourprimaries" value="1"/>
    <SupplementaryDescriptor schemeIdUri="urn:brdcst:video:cvtdynamicrange" value="2"/>
    <SupplementaryDescriptor schemeIdUri="urn:brdcst:video:cvttransferfunction" value="2"/>
    <SupplementaryDescriptor schemeIdUri="urn:brdcst:video:cvtxycolourprimaries" value="1"/>
    <SupplementaryDescriptor schemeIdUri="urn:brdcst:video:cvtconversion_type" value="0"/>

<Representation frameRate=60>
      <width="3840" height="2160" frameRate="60"
      codecs="hev1.xx.xx.L153.xx"
      level="0"/>
      <BaseURL>videostreamBase.mp4</BaseURL>
    </Representation>
    <Representation frameRate=120>
      width="3840" height="2160" frameRate="120"
      codecs="hev1.xx.xx.L156.xx"
      level="1"
      dependencyLevel="0"/>
      <BaseURL>videostreamEnhanced.mp4</BaseURL>
    </Representation>
  </AdaptationSet>
</Period>
```

MPD

FIG. 24

```
MPD
<Period>
  <AdaptationSet mimeType="video/mp4" codecs="hev1.xx.xx.L123.xx, hev1.yy.yy.L153.yy">
    <SupplementaryDescriptor schemeIdUri="urn:brdcst:video:cvtdynamicrange" value="1"/>
    <SupplementaryDescriptor schemeIdUri="urn:brdcst:video:cvttransferfunction" value="2"/>
    <SupplementaryDescriptor schemeIdUri="urn:brdcst:video:cvtxycolourprimaries" value="1"/>
    <SupplementaryDescriptor schemeIdUri="urn:brdcst:video:cvtconversion_type" value="1"/>
    <Representation>
      <SupplementaryDescriptor schemeIdUri="urn:brdcst:video:codeddynamicrange" value="0"/>
      <SupplementaryDescriptor schemeIdUri="urn:brdcst:video:codedtransferfunction" value="0"/>
      <SupplementaryDescriptor schemeIdUri="urn:brdcst:video:codedxycolourprimaries" value="0"/>
      <width="1920" height="1080" frameRate="60"
       codecs="hev1.xx.xx.L123.xx"
       level="0" />
      <BaseURL>videostreamBase.mp4</BaseURL>
    </Representation>
    <Representation>
      <SupplementaryDescriptor schemeIdUri="urn:brdcst:video:codeddynamicrange" value="1"/>
      <SupplementaryDescriptor schemeIdUri="urn:brdcst:video:codedtransferfunction" value="2"/>
      <SupplementaryDescriptor schemeIdUri="urn:brdcst:video:codedxycolourprimaries" value="1"/>
      <width="3840" height="2160" frameRate="60"
       codecs="hev1.xx.xx.L153.xx"
       level="1"
       dependencyLevel="0" />
      <BaseURL>videostreamEnhanced.mp4</BaseURL>
    </Representation>
  </AdaptationSet>
</Period>
```

FIG. 25

```
semantics
<SupplementaryDescriptor schemeIdUri="urn:brdcst:video:codeddynamicrange" value="Dynamicrange"/>
    INDICATE DYNAMIC RANGE INFORMATION OF ENCODED VIDEO
        value=1    HDR
        value=0    SDR
<SupplementaryDescriptor schemeIdUri="urn:brdcst:video:codedtransferfunction" value="EOTFtype"/>
    INDICATE EOTF TYPE OF ENCODED VIDEO
        value=2    PQ
        value=1    HLG
        value=0    gamma
<SupplementaryDescriptor schemeIdUri="urn:brdcst:video:codedxycolourprimaries" value="ColorGamut"/>
    INDICATE COLOR PRIMARY OF ENCODED VIDEO
        value=1    2020
        value=0    709
<SupplementaryDescriptor schemeIdUri="urn:brdcst:video:cvtdynamicrange" value="Dynamicrange"/>
    INDICATE DYNAMIC RANGE INFORMATION OF VIDEO AFTER CONVERSION
        value=1    HDR
        value=0    SDR
<SupplementaryDescriptor schemeIdUri="urn:brdcst:video:cvttransferfunction" value="EOTFtype"/>
    INDICATE EOTF TYPE OF VIDEO AFTER CONVERSION
        value=2    PQ
        value=1    HLG
        value=0    gamma
<SupplementaryDescriptor schemeIdUri="urn:brdcst:video:cvtxycolourprimaries" value="ColorGamut"/>
    INDICATE COLOR PRIMARY OF VIDEO AFTER CONVERSION
        value=1    2020
        value=0    709
<SupplementaryDescriptor schemeIdUri="urn:brdcst:video:cvtconversion_type" value="cvttype"/>
    INDICATE TYPE OF METADATA USED FOR CONVERSION
        value=2    HDR->HDR-low  CONVERSION METADATA 2 (SMPTE2094-40)
        value=1    HDR->HDR-low  CONVERSION METADATA 1 (SMPTE2094-10)
        value=0    SDR->HDR  CONVERSION METADATA (ETSI TS 103433-1)
```

FIG. 26

| Syntax | No. of Bits | Format |
|---|---|---|
| multidimension_descriptor() { | | |
|    multidimension_descriptor_tag | 8 | |
|    multidimension_descriptor_length | 8 | |
|    profile_idc | 8 | |
|    level_idc | 8 | |
|    resolution | 8 | |
|    frame_rate | 8 | |
|    bitdepth | 8 | |
|    codeddynamicrange | 8 | |
|    codedtransferfunction | 8 | |
|    codedxycolourprimaries | 8 | |
|    external_conversion_flag | 1 | |
|    reserved | 7 | |
|    if(external_conversion_flag == 1) { | | |
|       cvtdynamicrange | 8 | |
|       cvttransferfunction | 8 | |
|       cvtxycolourprimaries | 8 | |
|       cvtconversion_type | 8 | |
|    } | | |
|    layer_level | 8 | |
|    dependency_level | 8 | |
| } | | |

FIG. 27

| multidimension_descriptor | SEMANTICS | | |
|---|---|---|---|
| profile_idc (8bits) | INDICATE PROFILE OF ENCODING | VALUE THAT DEPENDS ON SPECIFICATION OF ENCODING SCHEME | |
| level_idc (8bits) | INDICATE LEVEL OF ENCODING | VALUE THAT DEPENDS ON SPECIFICATION OF ENCODING SCHEME | |
| resolution (8bits) | INDICATE RESOLUTION OF ENCODED IMAGE | | |
| | 0 | 640(H) x 480(V) | |
| | 1 | 1920(H) x 1080(V) | |
| | 2 | 3840(H) x 2160(V) | |
| | 3 | 7680(H) x 4320(V) | |
| frame_rate (8bits) | INDICATE FRAME RATE OF ENCODED IMAGE | | |
| | 0 | 24Hz, | 25Hz, |
| | 2 | 29.97Hz, | 30Hz, |
| | 4 | 50Hz, | 59.94Hz, |
| | 6 | 60Hz, | 100Hz, |
| | 8 | 119.88Hz, | 120Hz |
| bitdepth (8bits) | INDICATE BIT DEPTH OF COMPONENT OF ENCODE IMAGE | | |
| | 0 | 8bits | |
| | 1 | 10bits | |
| external_conversion_flag (1bit) | FLAG INDICATING WHETHER META INFORMATION TO BE CONVERTED OUTSIDE CODEC IS INCLUDED | | |
| | 1 | CONVERSION META IS INCLUDED | |
| | 0 | CONVERSION META IS NOT INCLUDED | |
| cvtconversion_type (8bts) | INDICATE TYPE OF CONVERSION METADATA | | |
| | 0 | SDR->HDR CONVERSION METADATA | (ETSI TS 103433-1) |
| | 1 | HDR->Non-HDR CONVERSION METADATA 1 | (SMPTE2094-10) |
| | 2 | HDR->Non-HDR CONVERSION METADATA 2 | (SMPTE2094-40) |
| layer_level (8bits) | INDICATE layer VALUE OF ENCODED STREAM | | |
| | 0 | base layer | |
| | 1 | enhanced layer | |
| dependency_level (8bits) | INDICATE layer_level OF STREAM THAT IS DIRECTLY REFERRED TO IN CASE OF ENCODED STREAM OTHER THAN base LAYER | | |

TRANSMISSION DEVICE, TRANSMISSION METHOD, RECEPTION DE-VICE, AND RECEPTION METHOD

CROSS REFERENCE TO RELATED APPLICATIONS

This application is a continuation of U.S. application Ser. No. 16/629,993, filed on Jan. 10, 2020, and is based upon and claims the benefit of priority to International Application No. PCT/JP2018/026828, filed on Jul. 18, 2018 and JP 2017-140592, filed on Jul. 20, 2017. The entire contents of U.S. Ser. No. 16/629,993 are incorporated herein by reference.

TECHNICAL FIELD

The present technology relates to a transmission device, a transmission method, a reception device, and a reception method, and relates to a transmission device that encodes and transmits image data of a base layer and an enhanced layer, or the like.

BACKGROUND ART

Conventionally, it is known to send high-quality format image data along with basic format image data, and to selectively use the basic format image data or the high-quality format image data on a reception side. For example, Patent Document 1 describes performing media encoding in a scalable manner, generating a base layer encoded stream for a low-resolution video service and an enhanced layer encoded stream for a high-resolution video service, and transmitting a container containing these streams. Note that the high-quality format includes high dynamic range, wide color gamut, high bit length, and the like, in addition to high resolution.

CITATION LIST

Patent Document

Patent Document 1: Japanese Patent Application Laid-Open No. 2008-543142

SUMMARY OF THE INVENTION

Problems to be Solved by the Invention

When performing transmission assuming that terminals with various capabilities receive delivery by single broadcast or communication, it is necessary to transmit delivery information such that the delivery information can be easily acquired on the reception side.

An object of the present technology is to make it possible to easily acquire at least function enhancement information inside a codec on the reception side.

Solutions to Problems

An idea of the present technology is
a transmission device including:
an image encoding unit configured to encode image data of each picture of a base layer to generate a first encoded stream, and to encode image data of each picture of an enhanced layer to generate a second encoded stream;
a stream transmission unit configured to transmit the first encoded stream and the second encoded stream; and
an information transmission unit configured to transmit, outside the encoded stream, function enhancement information including at least function enhancement information inside a codec.

In the present technology, the image encoding unit encodes image data of each picture of the base layer to generate the first encoded stream, and encodes image data of each picture of the enhanced layer to generate the second encoded stream. The stream transmission unit transmits the first encoded stream and the second encoded stream. Furthermore, the information transmission unit transmits, outside the encoded stream, function enhancement information including at least function enhancement information inside a codec.

For example, the information transmission unit may insert the function enhancement information into a layer of a container including the first encoded stream and the second encoded stream for transmission. In this case, for example, the container may include MPEG2-TS, and the information transmission unit may insert the function enhancement information into a program map table for transmission. Furthermore, in this case, for example, the container may include an MMT stream, and the information transmission unit may insert the function enhancement information into an MMT package table for transmission. Furthermore, an information insertion unit configured to insert conversion information of a dynamic range and a color gamut into the second encoded stream may be provided.

Furthermore, for example, the information transmission unit may insert the function enhancement information into a metafile having meta information regarding the first encoded stream and the second encoded stream for transmission. In this case, for example, the metafile may include an MPD file.

In this way, in the present technology, function enhancement information including at least function enhancement information inside a codec is transmitted outside the encoded stream. Therefore, the reception side can easily obtain at least function enhancement information inside the codec, and can appropriately perform function enhancement processing inside the codec according to display capability.

Note that in the present technology, for example, the function enhancement information may further include function enhancement information outside the codec. In this case, for example, the function enhancement information outside the codec may include information regarding conversion of a dynamic range and a color gamut. This enables the reception side to easily acquire the function enhancement information outside the codec, and on the basis of this information, this makes it possible to appropriately perform function enhancement processing outside the codec according to display capability.

Furthermore, another idea of the present technology is
a reception device including:
a stream reception unit configured to receive a first encoded stream generated by encoding image data of each picture of a base layer, and a second encoded stream generated by encoding image data of each picture of an enhanced layer;
an information reception unit configured to receive function enhancement information including at least function enhancement information inside a codec, the function enhancement information being sent outside the encoded stream; and a processing unit configured to process the first encoded stream and the second encoded stream on the basis of the function enhancement information.

In the present technology, the stream reception unit receives the first encoded stream generated by encoding image data of each picture of the base layer, and the second encoded stream generated by encoding image data of each picture of the enhanced layer. The information transmission unit receives function enhancement information including at least function enhancement information inside the codec, the function enhancement information being sent outside the encoded stream. Then, the processing unit processes the first encoded stream and the second encoded stream on the basis of the function enhancement information.

In this way, the present technology receives, outside the encoded stream, at least the function enhancement information inside the codec, and processes the first encoded stream and the second encoded stream on the basis of this information. Therefore, it is possible to easily acquire at least function enhancement information inside the codec, and to appropriately perform function enhancement processing inside the codec according to display capability.

Note that in the present technology, for example, the function enhancement information may further include function enhancement information outside the codec. In this case, for example, the function enhancement information outside the codec may include information regarding conversion of a dynamic range and a color gamut. This makes it possible to easily acquire the function enhancement information outside the codec, and to appropriately perform function enhancement processing outside the codec according to display capability.

Effects of the Invention

According to the present technology, it is possible to easily acquire at least function enhancement information inside a codec on the reception side. Note that advantageous effects described here are not necessarily restrictive, and any of the effects described in the present disclosure may be applied.

BRIEF DESCRIPTION OF DRAWINGS

FIG. 8 is a diagram showing one example of metadata "DRCL1_mapping" for converting the dynamic range from SDR to HDR, and metadata "DRCL2_mapping" for converting the dynamic range from HDR to HDR-low (including SDR).

FIG. 9 is a diagram showing a structure example of metadata "DRCL_mapping."

FIG. 10 is a diagram showing contents of main information in the structure example of the metadata "DRCL_mapping."

FIG. 20 is a diagram showing a description example of the MPD file corresponding to first layer decomposition.

FIG. 21 is a diagram showing a description example of the MPD file corresponding to second layer decomposition.

FIG. 22 is a diagram showing a description example of the MPD file corresponding to third layer decomposition.

FIG. 23 is a diagram showing a description example of the MPD file corresponding to fourth layer decomposition.

FIG. 24 is a diagram showing a description example of the MPD file corresponding to fifth layer decomposition.

FIG. 25 is a diagram showing "value" semantics of "SupplementaryDescriptor."

FIG. 26 is a diagram showing a structure example of multidimension_descriptor.

FIG. 27 is a diagram showing contents of main information in the structure example of multidimension_descriptor.

MODE FOR CARRYING OUT THE INVENTION

A mode for carrying out the invention (hereinafter referred to as an embodiment) will be described below. Note that the description will be made in the following order.

1. Embodiment
2. Modification

<1. Embodiment>

[Overview of MPEG-DASH-Based Stream Delivery System]

First, an overview of an MPEG-DASH-based stream delivery system to which the present technology is applicable will be described.

Figure 1:
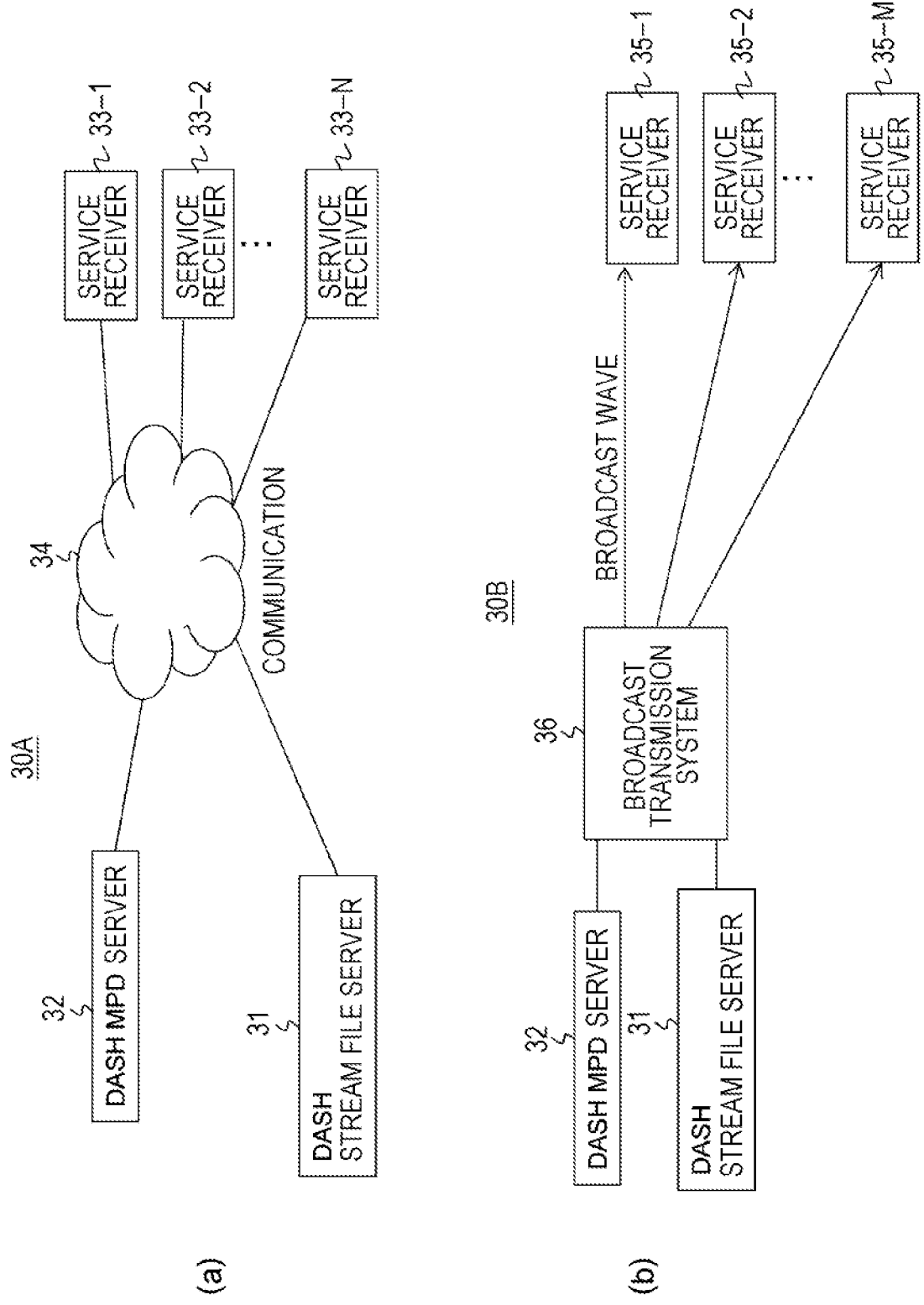
FIG. 1 is block diagrams each showing a configuration example of an MPEG-DASH-based stream delivery system.

FIG. 1(a) shows a configuration example of an MPEG-DASH-based stream delivery system 30A. In this configuration example, a media stream and a media presentation description (MPD) file are transmitted through a communication network transmission path (communication transmission path). This stream delivery system 30A has a configuration in which N service receivers 33-1, 33-2, . . . , 33-N are connected to a DASH stream file server 31 and a DASH MPD server 32 via a content delivery network (CDN) 34.

The DASH stream file server 31 generates a DASH specification stream segment (hereinafter referred to as "DASH segment" as appropriate) on the basis of media data of predetermined content (video data, audio data, subtitle data, or the like), and transmits the segment in response to an HTTP request from the service receivers. This DASH stream file server 31 may be a dedicated server for streaming, or a web server may serve as the DASH stream file server 31.

Furthermore, in response to a request for a segment of a predetermined stream sent from the service receiver (33-1, 33-2, . . . , 33-N) via the CDN 34, the DASH stream file server 31 transmits the segment of the stream to the receiver that has made the request via the CDN 34. In this case, with reference to a rate value described in the media presentation description (MPD) file, the service receiver 33 selects the stream with the optimum rate according to a state of a network environment where a client is placed, and makes a request.

The DASH MPD server 32 is a server that generates an MPD file for acquiring the DASH segment generated in the DASH stream file server 31. The MPD file is generated on the basis of content metadata from a content management server (not shown) and an address (url) of the segment generated in the DASH stream file server 31. Note that the DASH stream file server 31 and the DASH MPD server 32 may be physically the same.

In an MPD format, each attribute is described using an element called representation for each stream such as video or audio. For example, in the MPD file, each rate is described by dividing the representation for each of a plurality of video data streams having different rates. With reference to values of the rates, the service receiver 33 can select an optimum stream according to a state of the network environment where the service receiver 33 is placed as described above.

FIG. 1(b) shows a configuration example of an MPEG-DASH-based stream delivery system 30B. In this configuration example, the media stream and the MPD file are transmitted through an RF transmission path (broadcast transmission path). This stream delivery system 30B includes a broadcast transmission system 36 to which the DASH stream file server 31 and the DASH MPD server 32 are connected, and M service receivers 35-1, 35-2, . . . , 35-M.

In a case of this stream delivery system 30B, the broadcast transmission system 36 transmits the DASH specification stream segment generated by the DASH stream file server 31 (DASH segment) and the MPD file generated by the DASH MPD server 32 on a broadcast wave.

Figure 2:
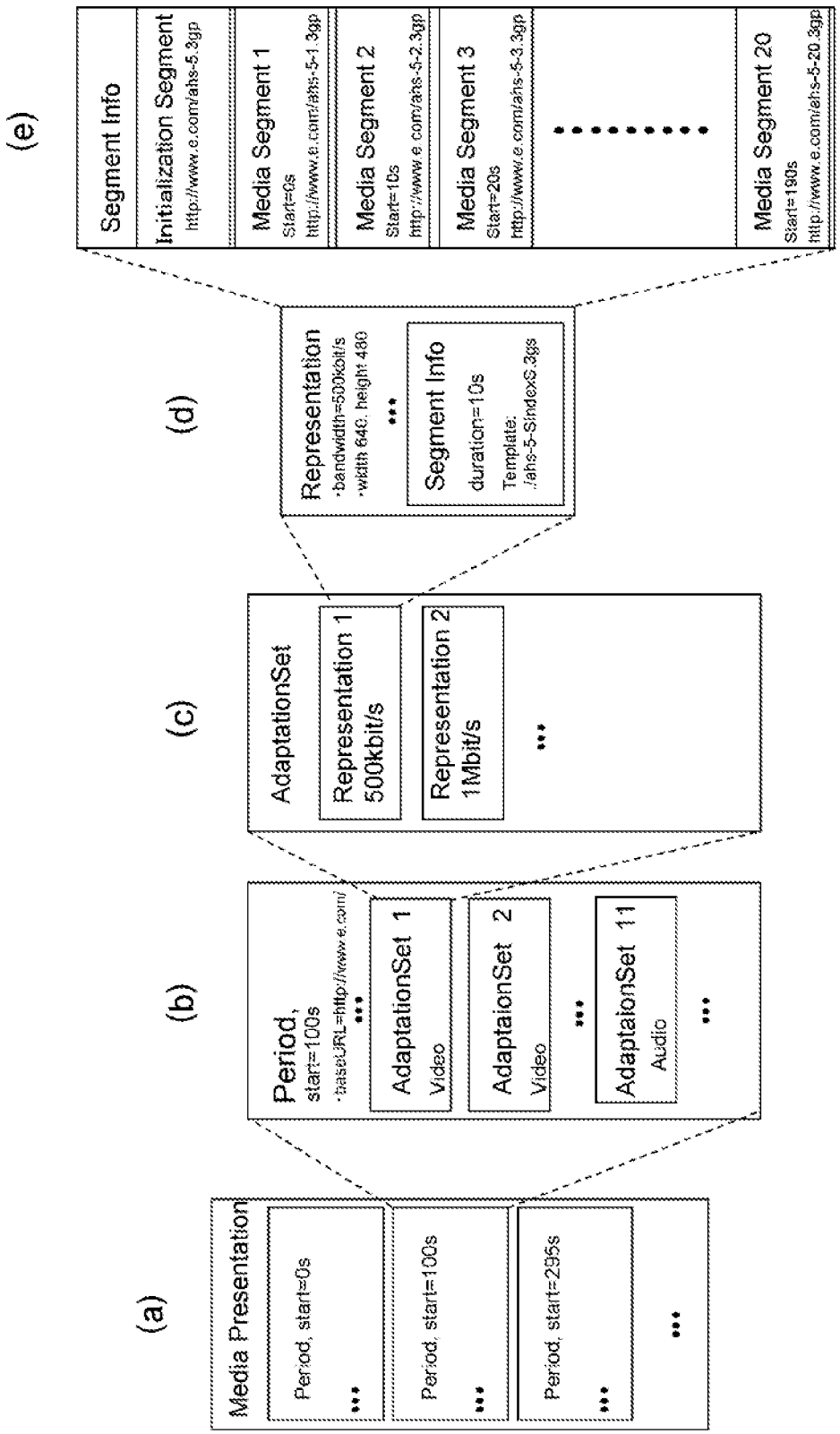
FIG. 2 is a diagram showing one example of a relationship between respective structures arranged hierarchically in an MPD file.

FIG. 2 shows one example of a relationship between respective structures arranged hierarchically in the MPD file. As shown in FIG. 2(a), in a media presentation as a whole MPD file, a plurality of periods separated at time intervals exists. For example, the first period starts from 0 seconds, the next period starts from 100 seconds, and so on.

As shown in FIG. 2(b), in each period, a plurality of adaptation sets exists. Each adaptation set depends on a difference in media types such as video or audio, a difference in languages or viewpoints for the same media type, or the like. As shown in FIG. 2(c), in the adaptation set, a plurality of representations exists. Each representation depends on a difference in stream attributes, such as a difference in rates, for example.

As shown in FIG. 2(d), the representation includes segment info. In this segment info, as shown in FIG. 2(e), an initialization segment and a plurality of media segments that describes information for each segment obtained by further dividing the period exist. In the media segment, information such as an address (url) for actually acquiring segment data such as video or audio exists.

Note that stream switching can be arbitrarily performed between the plurality of representations included in the adaptation set. With this arrangement, a stream of an optimal rate can be selected according to a state of the network environment on the reception side, and uninterrupted video delivery is possible. [Configuration Example of Transmission-Reception System]

Figure 3:
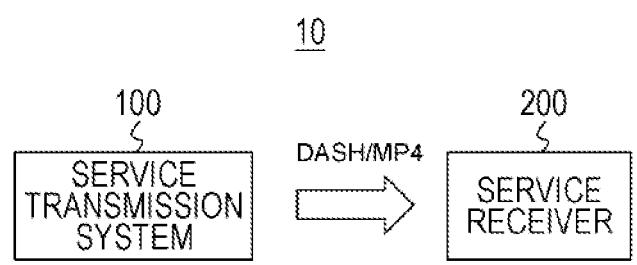
FIG. 3 is a block diagram showing a configuration example of a transmission-reception system as an embodiment.

FIG. 3 shows a configuration example of a transmission-reception system 10 as the embodiment. This transmission-reception system 10 includes a service transmission system 100 and a service receiver 200. In this transmission-reception system 10, the service transmission system 100 corresponds to the DASH stream file server 31 and the DASH MPD server 32 of the stream delivery system 30A shown in FIG. 1(a) described above. Furthermore, in this transmission-reception system 10, the service transmission system 100 corresponds to the DASH stream file server 31, the DASH MPD server 32, and the broadcast transmission system 36 of the stream delivery system 30B shown in FIG. 1(b) described above.

Furthermore, in this transmission-reception system 10, the service receiver 200 corresponds to the service receiver 33 (33-1, 33-2, . . . , 33-N) of the stream delivery system 30A shown in FIG. 1(a) described above. Furthermore, in this transmission-reception system 10, the service receiver 200 corresponds to the service receiver 35 (35-1, 35-2, . . . , 35-M) of the stream delivery system 30B shown in FIG. 1(b) described above.

The service transmission system 100 transmits DASH/MP4, that is, MP4 including the MPD file as a metafile and the media stream (media segment) such as video or audio through the communication network transmission path (see FIG. 1(a)) or the RF transmission path (see FIG. 1(b)).

In this embodiment, a first encoded stream and a second encoded stream are included as the media stream. The first encoded stream is obtained by encoding image data of each picture of a base layer. The second encoded stream is obtained by encoding image data of each picture of an enhanced layer.

The MPD file has meta information regarding the first encoded stream and the second encoded stream. In this embodiment, this MPD file includes function enhancement information including at least function enhancement information inside a codec. Note that this function enhancement information may also include function enhancement information outside the codec. For example, the function enhancement information outside the codec includes information regarding conversion of a dynamic range and a color gamut.

The service receiver 200 receives the above-described MP4 transmitted from the service transmission system 100 through the communication network transmission path (see FIG. 1(a)) or the RF transmission path (see FIG. 1(b)). In addition to meta information regarding the first encoded stream and the second encoded stream, the service receiver 200 acquires, from the MPD file, the function enhancement information including the function enhancement information inside the codec, and furthermore, the function enhancement information outside the codec in a case where this information exists. Then, the service receiver 200 performs function enhancement processing according to display capability on the basis of the function enhancement information and displays images.

In a case where image data of ultra HD (UHD) high dynamic range (HDR) is delivered to a plurality of reception terminals (receivers) with different display capabilities, the image data is transmitted after layer decomposition, for example, as shown in (1) to (5) below. Then, in this embodiment, the MPD describes a decomposition state accurately.

(1) First Layer Decomposition (One Dimension of Dynamic Range)

This layer decomposition is one-dimensional layer decomposition of the dynamic range, and scalable encoding of standard dynamic range (SDR) and high dynamic range (HDR) are performed for transmission.

Figure 4:
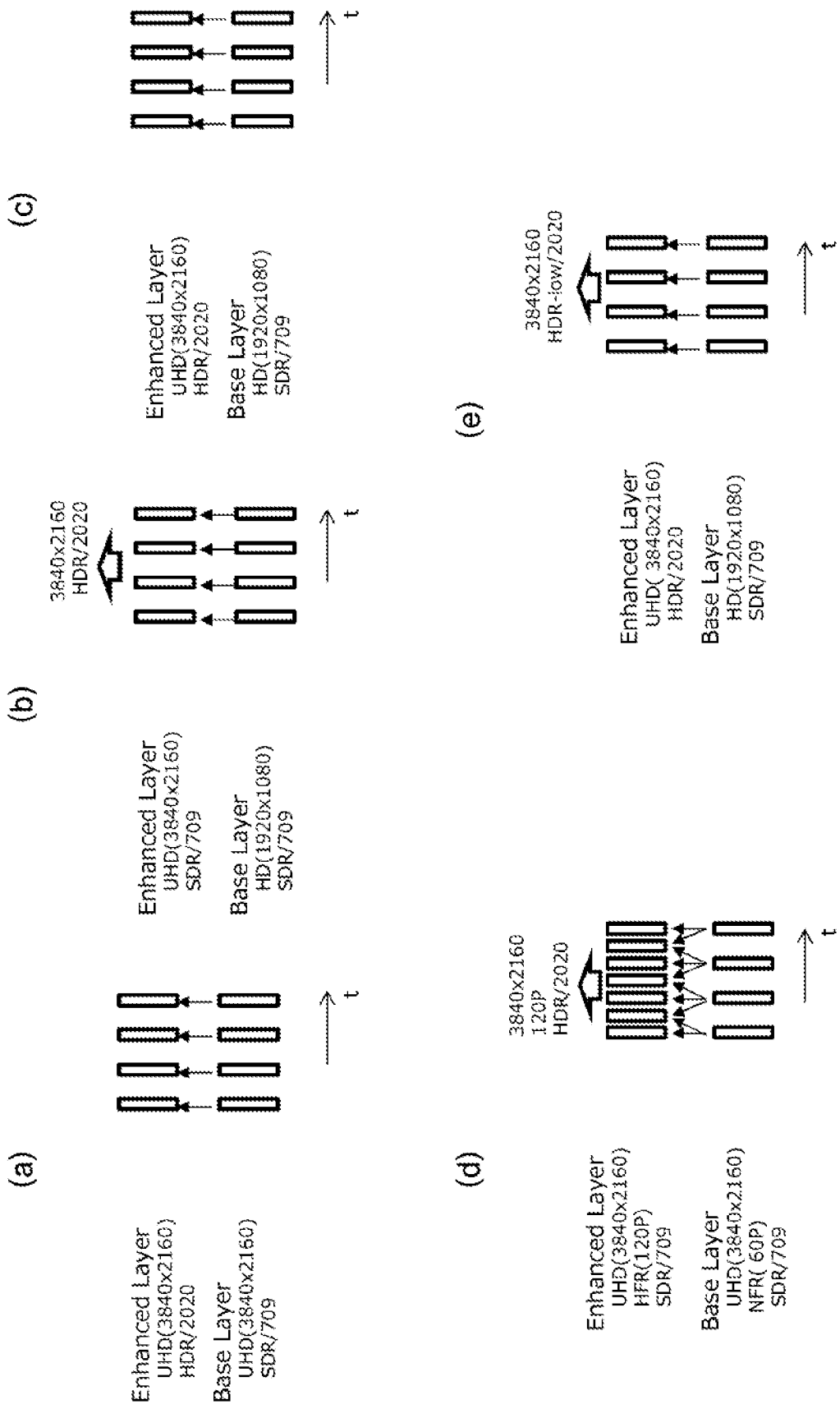
FIG. 4 is a diagram for describing conversion processing inside and outside a codec in first to fifth layer decomposition.

FIG. 4(a) shows conversion processing inside the codec in this case. A horizontal axis indicates a temporal direction. In each picture of the base layer, the resolution is the UHD resolution of 3840*2160, the dynamic range is SDR, and the color gamut is 709. For this base layer, image data of each picture of the base layer is encoded.

In each picture of the enhanced layer, the resolution is the UHD resolution of 3840*2160, the dynamic range is HDR, and the color gamut is 2020. Regarding this enhanced layer, a difference in dynamic range and color gamut from the base layer is encoded for image data of each picture of the enhanced layer.

In this case, if the reception side has only UHD SDR display capability, only the encoded stream of the base layer is selectively decoded, image data is acquired in which the resolution is the UHD resolution of 3840*2160, the dynamic range is SDR, and the color gamut is 709, and a UHD SDR image is displayed on a display (display unit).

Furthermore, in this case, if the reception side has UHD HDR display capability, the encoded streams of both the base layer and the enhanced layer are decoded, image data is acquired in which the resolution is the UHD resolution of 3840*2160, the dynamic range is HDR, and the color gamut is 2020, and a UHD HDR image is displayed on the display (display unit).

(2) Second Layer Decomposition (Two Dimensions of Resolution and Dynamic Range)

This layer decomposition is two-dimensional layer decomposition of resolution and dynamic range, HD and UHD scalable encoding is performed for transmission, and the reception side can convert the dynamic range from SDR to HDR.

FIG. 4(b) shows conversion processing inside and outside the codec in this case. A horizontal axis indicates a temporal direction. In each picture of the base layer, the resolution is the HD resolution of 1920*1080, the dynamic range is SDR, and the color gamut is 709. For this base layer, image data of each picture of the base layer is encoded.

In each picture of the enhanced layer, the resolution is the UHD resolution of 3840*2160, the dynamic range is SDR, and the color gamut is 709. For this enhanced layer, a difference in resolution from the base layer is encoded for image data of each picture of the enhanced layer.

Furthermore, after the enhanced layer is decoded, the dynamic range is converted from SDR to HDR, and metadata (auxiliary information) for obtaining image data in which the resolution is the UHD resolution of 3840*2160, the dynamic range is HDR, and the color gamut of 2020 is added.

In this case, when the reception side has only HD SDR display capability, only the encoded stream of the base layer is selectively decoded, image data is acquired in which the resolution is the UHD resolution of 1920*1080, the dynamic range is SDR, and the color gamut is 709, and an HD SDR image is displayed on the display (display unit).

Furthermore, in this case, in a case where the reception side has UHD SDR display capability, the encoded streams of both the base layer and the enhanced layer are decoded, image data is acquired in which the resolution is the UHD resolution of 3840*2160, the dynamic range is SDR, and the color gamut is 709, and a UHD SDR image is displayed on the display (display unit).

Furthermore, in this case, in a case where the reception side has UHD HDR display capability, the encoded streams of both the base layer and the enhanced layer are decoded, and image data is acquired in which the resolution is the UHD resolution of 3840*2160, the dynamic range is SDR, and the color gamut is 709. Moreover, on the reception side, on the basis of metadata, SDR to HDR conversion is performed into image data in which the resolution is the UHD resolution of 3840*2160, the dynamic range is HDR, and the color gamut is 2020, and a UHD HDR image is displayed on the display (display unit).

(3) Third Layer Decomposition (Two Dimensions of Resolution and Dynamic Range)

This layer decomposition is two-dimensional layer decomposition of resolution and dynamic range in a similar manner to (2), but HD and UHD scalable encoding and SDR and HDR scalable encoding are performed for transmission.

FIG. 4(c) shows conversion processing inside the codec in this case. A horizontal axis indicates a temporal direction. In each picture of the base layer, the resolution is the HD resolution of 1920*1080, the dynamic range is SDR, and the color gamut is 709. For this base layer, image data of each picture of the base layer is encoded.

In each picture of the enhanced layer, the resolution is the UHD resolution of 3840*2160, the dynamic range is HDR, and the color gamut is 2020. For this enhanced layer, a difference in resolution and furthermore dynamic range and color gamut from the base layer is encoded for image data of each picture of the enhanced layer.

In this case, in a case where the reception side has only HD SDR display capability, only the encoded stream of the base layer is selectively decoded, image data is acquired in which the resolution is the HD resolution of 1920*1080, the dynamic range is SDR, and the color gamut is 709, and an HD SDR image is displayed on the display (display unit).

Furthermore, in this case, in a case where the reception side has UHD HDR display capability, the encoded streams of both the base layer and the enhanced layer are decoded, image data is acquired in which the resolution is the UHD resolution of 3840*2160, the dynamic range is HDR, and the color gamut is 2020, and a UHD HDR image is displayed on the display (display unit).

(4) Fourth Layer Decomposition (Two Dimensions of Frame Rate and Dynamic Range)

This layer decomposition is two-dimensional layer decomposition of frame rate and dynamic range, normal frame rate (NFR) and high frame rate (HFR) scalable encoding is performed for transmission, and the reception side can convert the dynamic range from SDR to HDR.

FIG. 4(d) shows conversion processing inside and outside the codec in this case. A horizontal axis indicates a temporal direction. In each picture of the base layer, the frame rate is the NFR of 60 P, the resolution is the UHD resolution of 3840*2160, the dynamic range is SDR, and the color gamut is 709. For this base layer, image data of each picture of the base layer is encoded.

In each picture of the enhanced layer, the frame rate is HFR of 120 P, the resolution is the UHD resolution of 3840*2160, the dynamic range is SDR, and the color gamut is 709. For this enhanced layer, image data of each picture of the enhanced layer is encoded. Note that for this enhanced layer, it is also considered to encode only the +60 P frame positioned between respective pictures in the base layer.

Furthermore, after the enhanced layer is decoded, the dynamic range is converted from SDR to HDR, and metadata (auxiliary information) for obtaining image data in which the resolution is the UHD resolution of 3840*2160, the dynamic range is HDR, and the color gamut of 2020 is added.

In this case, in a case where the reception side has only LFR UHD SDR display capability, only the encoded stream of the base layer is selectively decoded, image data is acquired in which the frame rate is the NFR of 60 P, the resolution is the UHD resolution of 3840*2160, the dynamic range is SDR, and the color gamut is 709, and a NFR UHD SDR image is displayed on the display (display unit).

Furthermore, in this case, in a case where the reception side has HFR UHD SDR display capability, the encoded streams of both the base layer and the enhanced layer are decoded, image data is acquired in which the frame rate is HFR of 120 P, the resolution is the UHD resolution of 3840*2160, the dynamic range is SDR, and the color gamut is 709, and a UHD SDR image is displayed on the display (display unit).

Furthermore, in this case, in a case where the reception side has HFR UHD HDR display capability, the encoded streams of both the base layer and the enhanced layer are decoded, and image data is acquired in which the frame rate is HFR of 120 P, the resolution is the UHD resolution of 3840*2160, the dynamic range is SDR, and the color gamut is 709. Moreover, on the reception side, on the basis of metadata, SDR to HDR conversion is performed into image data in which the frame rate is HFR of 120 P, the resolution is the UHD resolution of 3840*2160, the dynamic range is HDR, and the color gamut is 2020, and an HFR UHD HDR image is displayed on the display (display unit).

(5) Fifth Layer Decomposition (Two Dimensions of Resolution and Dynamic Range)

This layer decomposition is two-dimensional layer decomposition of resolution and dynamic range in a similar manner to (3), HD and UHD scalable encoding and SDR and HDR scalable encoding are performed for transmission, and the reception side can convert the dynamic range from HDR to HDR-low (including SDR). Here, HDR-low means that brightness is lower than HDR.

FIG. 4(e) shows conversion processing inside the codec in this case. A horizontal axis indicates a temporal direction. In each picture of the base layer, the resolution is the HD resolution of 1920*1080, the dynamic range is SDR, and the color gamut is 709. For this base layer, image data of each picture of the base layer is encoded.

In each picture of the enhanced layer, the resolution is the UHD resolution of 3840*2160, the dynamic range is HDR, and the color gamut is 2020. For this enhanced layer, a difference in resolution and furthermore dynamic range and color gamut from the base layer is encoded for image data of each picture of the enhanced layer.

Furthermore, after the enhanced layer is decoded, the dynamic range is converted from HDR to HDR-low, and metadata (auxiliary information) for obtaining image data in which the resolution is the UHD resolution of 3840*2160, the dynamic range is HDR-low, and the color gamut of 2020 is added.

In this case, in a case where the reception side has only HD SDR display capability, only the encoded stream of the base layer is selectively decoded, image data is acquired in which the resolution is the HD resolution of 1920*1080, the dynamic range is SDR, and the color gamut is 709, and an HD SDR image is displayed on the display (display unit).

Furthermore, in this case, in a case where the reception side has UHD HDR display capability, the encoded streams of both the base layer and the enhanced layer are decoded, image data is acquired in which the resolution is the UHD resolution of 3840*2160, the dynamic range is HDR, and the color gamut is 2020, and a UHD HDR image is displayed on the display (display unit).

Furthermore, in this case, in a case where the reception side has UHD HDR-low display capability, the encoded streams of both the base layer and the enhanced layer are decoded, and image data is acquired in which the resolution is the UHD resolution of 3840*2160, the dynamic range is HDR, and the color gamut is 2020. Moreover, on the reception side, on the basis of metadata, HDR to HDR-low conversion is performed into image data in which the resolution is the UHD resolution of 3840*2160, the dynamic range is HDR-low, and the color gamut is 2020, and a UHD HDR-low image is displayed on the display (display unit).

Figure 5:
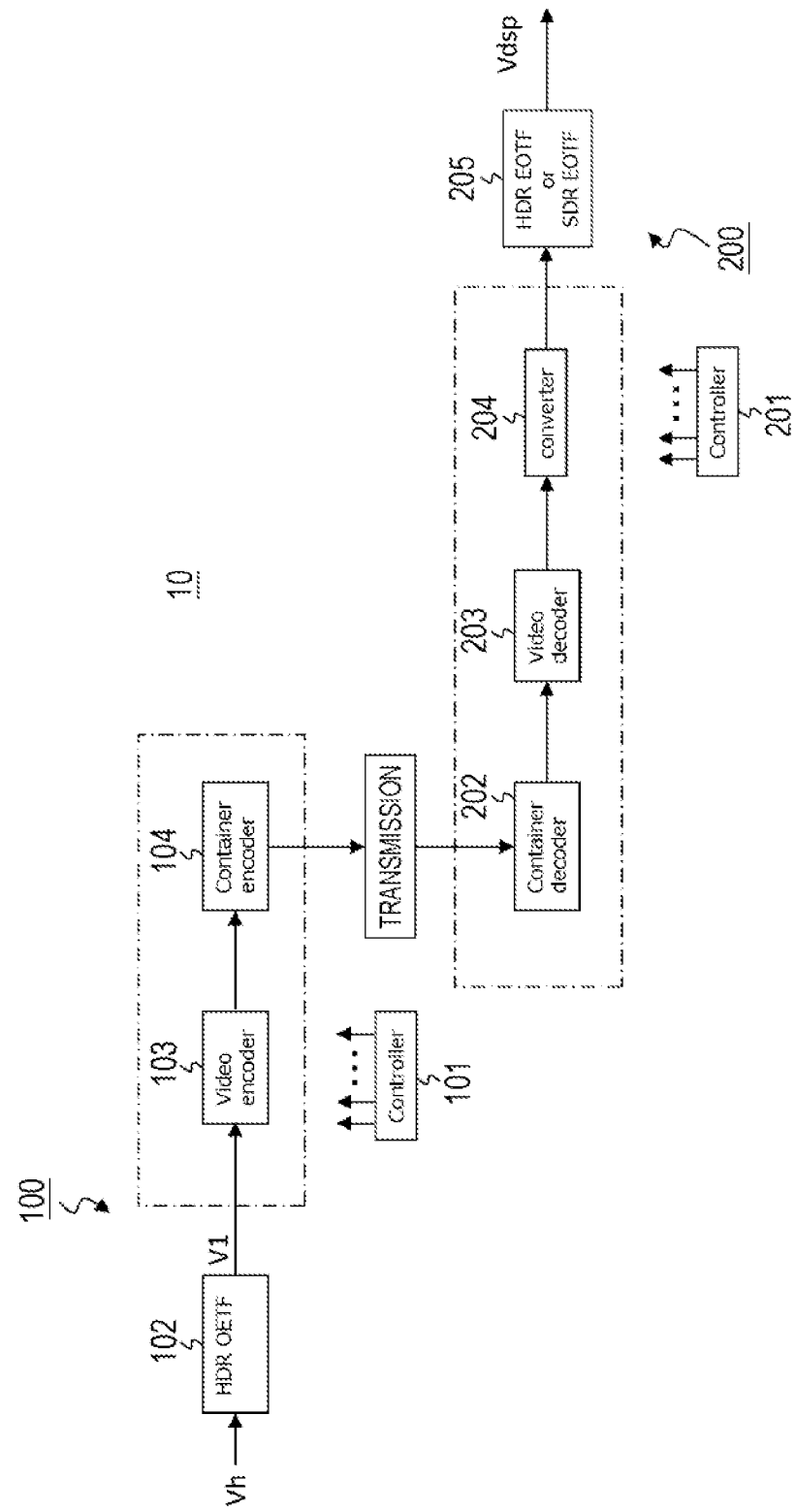
FIG. 5 is a diagram schematically showing a configuration example of an entire system of the transmission-reception system.

FIG. 5 schematically shows a configuration example of an entire system of the transmission-reception system 10. The service transmission system 100 includes a controller 101, an HDR opto-electronic conversion unit 102, a video encoder 103, and a container encoder 104.

The controller 101 controls an operation of each unit of the service transmission system 100. The HDR opto-electronic conversion unit 102 performs opto-electronic conversion by applying HDR opto-electronic conversion characteristics to UHD HDR image data (video data) Vh to obtain HDR transmission image data V1. The HDR transmission video data V1 is a video material produced by HDR OETF. For example, as the HDR opto-electronic conversion characteristics, characteristics of ITU-R Rec. BT. 2100 HLG (HLG: Hybrid Log-Gamma), characteristics of ITU-R Rec. BT. 2100 PQ (PQ: Perceptual Quantization), or the like are applied.

Figure 6:
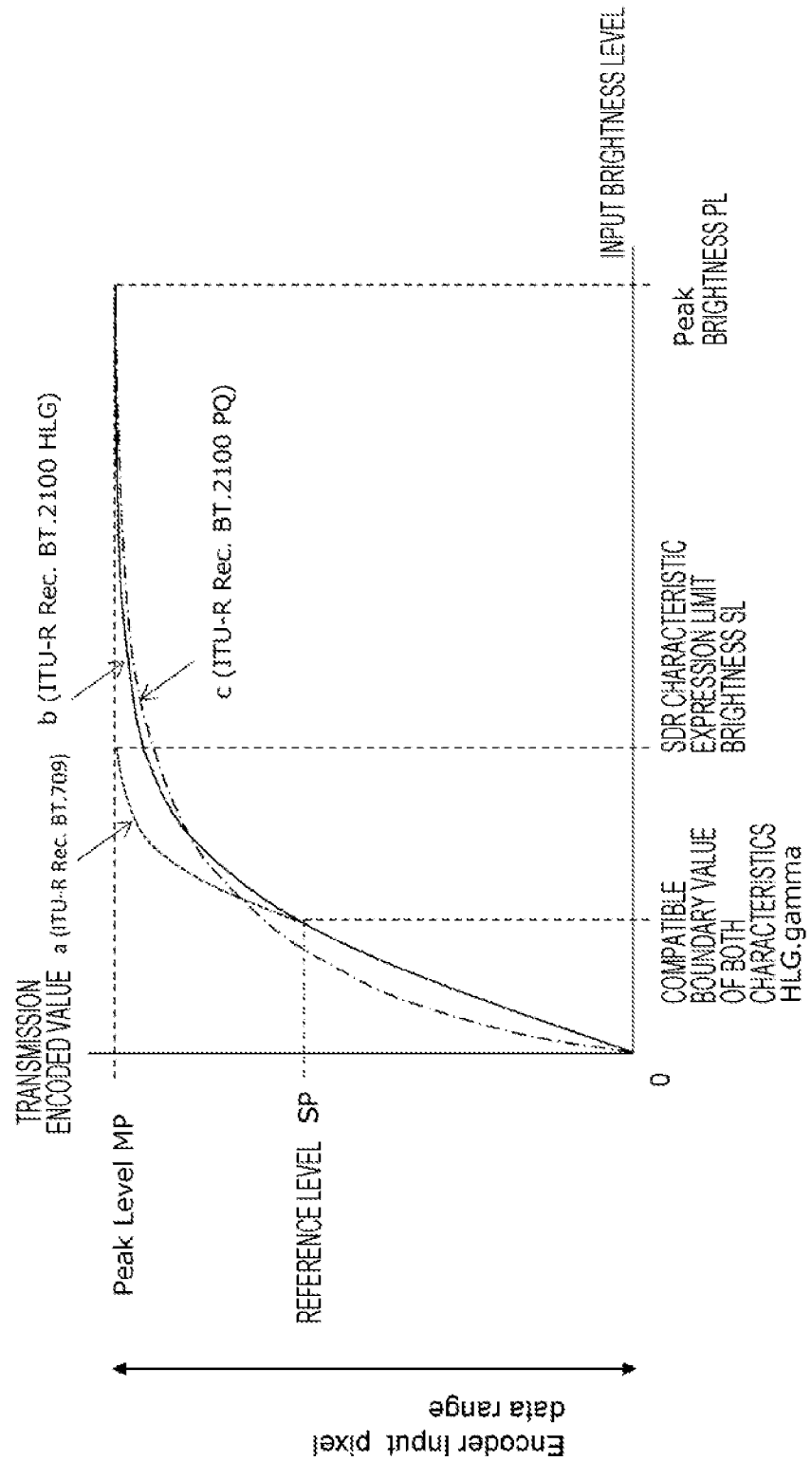
FIG. 6 is a diagram showing one example of optoelectronic conversion characteristics of SDR and HDR.

FIG. 6 shows one example of opto-electronic conversion characteristics of SDR and HDR. In this figure, a horizontal axis indicates an input brightness level, and a vertical axis indicates a transmission encoded value. A broken line a indicates SDR opto-electronic conversion characteristics (BT.709: gamma characteristic). In the SDR opto-electronic conversion characteristics, when the input brightness level is SDR characteristic expression limit brightness SL, the transmission encoded value is a peak level MP. Here, SL is, for example, 100 cd/m².

A solid line b indicates characteristics of ITU-R Rec. BT. 2100 HLG (HLG) as the HDR opto-electronic conversion characteristics. An alternate long and short dash line c indicates characteristics of ITU-R Rec. BT. 2100 PQ (PQ curve) as the HDR opto-electronic conversion characteristics. In the HDR opto-electronic conversion characteristics, when the input brightness level is the peak brightness PL, the transmission encoded value is the peak level MP.

The characteristics of ITU-R Rec. BT. 2100 HLG (HLG) include a compatible region with the SDR opto-electronic conversion characteristics (BT.709: gamma characteristics). That is, while the input brightness level is from zero to a compatible boundary value of both characteristics, the curves of both characteristics match. When the input brightness level is a compatible limit value, the transmission encoded value becomes a reference level SP. The characteristic of ITU-R Rec. BT. 2100 PQ (PQ curve) is a curve of a quantization step that corresponds to high brightness and is said to be compatible with human visual characteristics.

Returning to FIG. 5, the video encoder 103 performs encoding such as, for example, MPEG4-AVC or HEVC on the HDR encode target video data V1 to obtain the encoded image data, and generates the first encoded stream and the second encoded stream including the encoded image data. As described above, the first encoded stream is obtained by encoding image data of each picture of the base layer, and the second encoded stream is obtained by encoding image data of each picture of the enhanced layer.

In the second, fourth, and fifth layer decomposition described above, the video encoder 103 inserts, in an "SEIs" part of an access unit (AU), an SEI message having metadata for converting the dynamic range from SDR to HDR, or metadata for converting the dynamic range from HDR to HDR-low.

Figure 7:
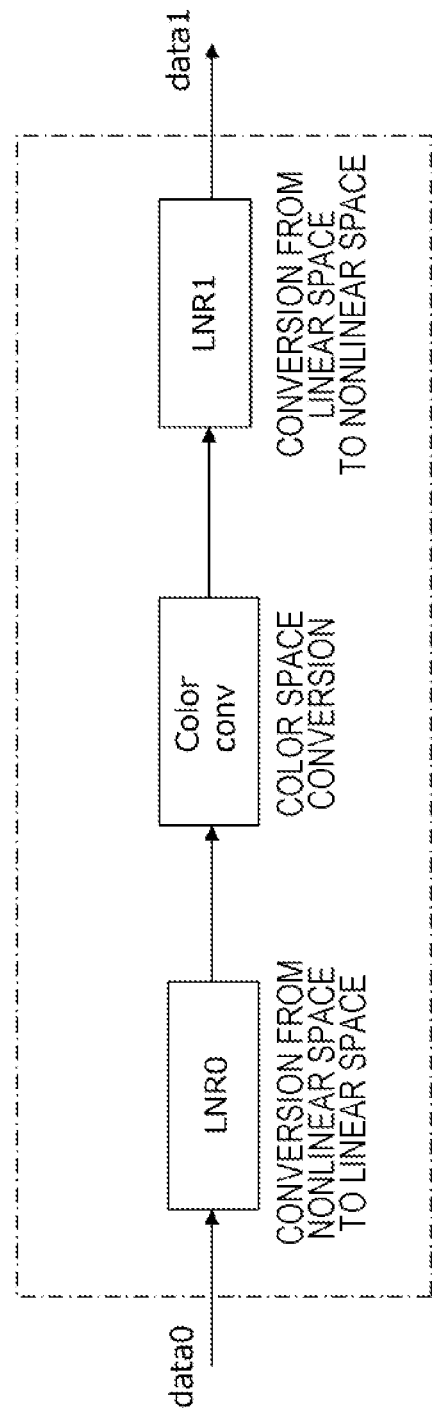
FIG. 7 is a diagram for describing data necessary for conversion processing of a dynamic range and a color space.

This metadata is data for conversion from data "data 0" before conversion to data "data 1" after conversion, and as shown in FIG. 7, the metadata is information necessary for three conversions, that is, conversion from nonlinear space to linear space "LNR 0", color space conversion "color conv", conversion from linear space to nonlinear space "LNR 1", pivot information necessary for reproducing a table or nonlinear characteristics, or the like.

FIG. 8(a) shows one example of metadata "DRCL1_mapping" for converting the dynamic range from SDR to HDR. In a case where the dynamic range is converted from SDR to PQ HDR, the metadata "DRCL1_mapping" is information for converting image data in which "transfer characteristic" is "SDR (gamma)" and "color gamut" is "709" into image data in which "transfer characteristic" is "HDR-PQ" and "color gamut" is "2020."

Furthermore, in a case where the dynamic range is converted from SDR to HLG HDR, the metadata "DRCL1_mapping" is information for converting image data in which "transfer characteristic" is "SDR (gamma)" and "color gamut" is "709" into image data in which "transfer characteristic" is "HDR-HLG" and "color gamut" is "2020."

FIG. 8(b) shows one example of metadata "DRCL2_mapping" for converting the dynamic range from HDR to HDR-low (including SDR). In a case where the dynamic range is converted from PQ HDR to HDR-low, the metadata "DRCL2_mapping" is information for converting image data in which "transfer characteristic" is "HDR-PQ" and "color gamut" is "2020" into image data in which "transfer characteristic" is "HDR-low" and "color gamut" is "2020." Note that the "*" mark includes that brightness conversion to HDR-low can be implemented by performing tone mapping.

Furthermore, in a case where the dynamic range is converted from HLG HDR to HDR-low (including SDR), the metadata "DRCL2_mapping" is information for converting image data in which "transfer characteristic" is "HDR-HLG" and "color gamut" is "2020" into image data in which "transfer characteristic" is "HDR-low" and "color gamut" is "2020." Note that the "*" mark includes that brightness conversion to HDR-low can be implemented by performing tone mapping.

FIG. 9 shows a structure example (syntax) of metadata "DRCL_mapping" constituting the above-described metadata "DRCL1_mapping" and the metadata "DRCL2_mapping." Furthermore, FIG. 10 shows contents of main information (semantics) in the structure example.

The 8-bit field of "in_transfer_function" indicates a non-linear transfer function of the encoded video. For example, "1" indicates ITU-R Rec. BT.709 characteristics, "16" indicates ITU-R Rec. BT.2100 PQ characteristics, and "18" indicates ITU-R Rec. BT.2100 HLG characteristics.

The 8-bit field of "in color primaries" indicates color primary (color gamut) of the encoded video. For example, "1" indicates ITU-R Rec. BT.709, and "9" indicates ITU-R Rec. BT.2100. The 8-bit field of "in_matrix_coeffs" indicates a color component matrix conversion coefficient of the encoded video. For example, "1" indicates a coefficient of ITU-R Rec. BT.709, and "9" indicates a coefficient of an ITU-R Rec. BT.2020 non-constant brightness system.

Here, in a case where "in_color_primaries" is ITU-R Rec. BT.709, "in_matrix_coeffs" is a coefficient of the ITU-R Rec. BT.709 system. Meanwhile, in a case where "in_color_primaries" is ITU-R Rec. BT.2020, "in_matrix_coeffs" is a coefficient of an ITU-R Rec. BT.2020 non-constant brightness system. The above is similar in cases of "out_color_primaries" and "out_matrix_coeffs."

The 8-bit field of "post_conversion_type" indicates the type of conversion metadata. For example, "0" indicates SDR->HDR conversion metadata (ETSI TS 103433-1), "1" indicates HDR->Non-HDR conversion metadata 1 (SMPTE2094-10), and "2" indicates HDR->Non-HDR conversion metadata 2 (SMPTE2094-40).

The 8-bit field of "out_transfer_function" indicates a non-linear transfer function of video after post-processing conversion. For example, "1" indicates ITU-R Rec. BT.709 characteristics, "16" indicates ITU-R Rec. BT.2100 PQ characteristics, and "18" indicates ITU-R Rec. BT.2100 HLG characteristics.

The 8-bit field of "out_color_primaries" indicates color primary (color gamut) of video after post-processing conversion. For example, "1" indicates ITU-R Rec. BT.709, and "9" indicates ITU-R Rec. BT.2100. The 8-bit field of "out_matrix_coeffs" indicates a color component matrix conversion coefficient of video after post-processing conversion. For example, "1" indicates a coefficient of ITU-R Rec. BT.709, and "9" indicates a coefficient of an ITU-R Rec. BT.2020 non-constant brightness system.

Figure 11:
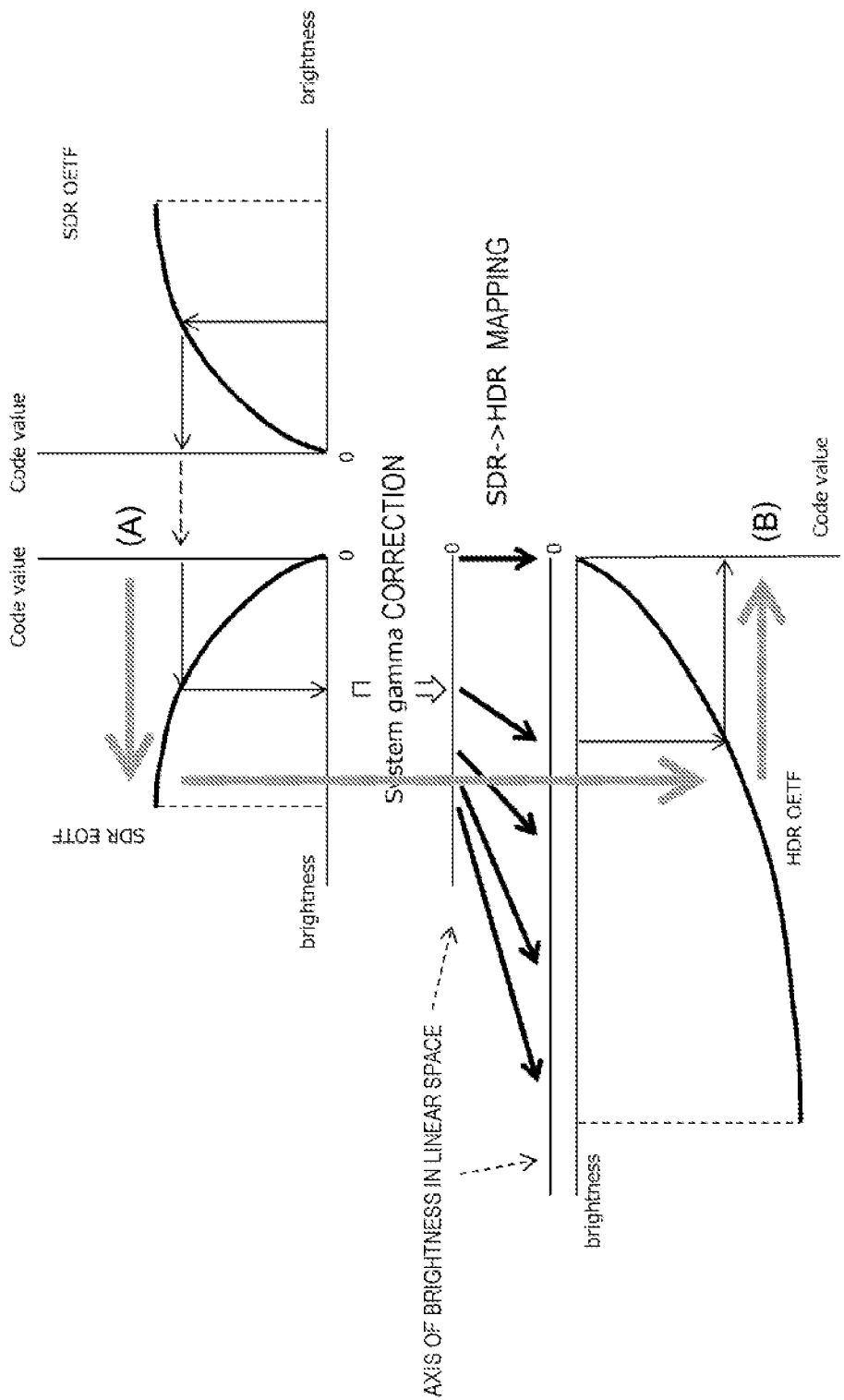
FIG. 11 is a diagram schematically showing dynamic range conversion processing from SDR to HDR.

FIG. 11 schematically shows dynamic range conversion processing from SDR to HDR. Note that the color space conversion is omitted in the illustrated example. (A) obtained by converting brightness of linear optical space into a transmission value by the SDR OETF characteristic exists in a range of the SDR brightness level of 0 to 100%.

(A) is converted by SDR EOTF, and further corrected by system gamma to obtain a maximum value of 100 cd/m² in a linear light ray space. The HDR OETF characteristic is applied to the brightness obtained by applying predetermined SDR/HDR mapping to the value to obtain a value of the HDR characteristic (B).

Figure 12:
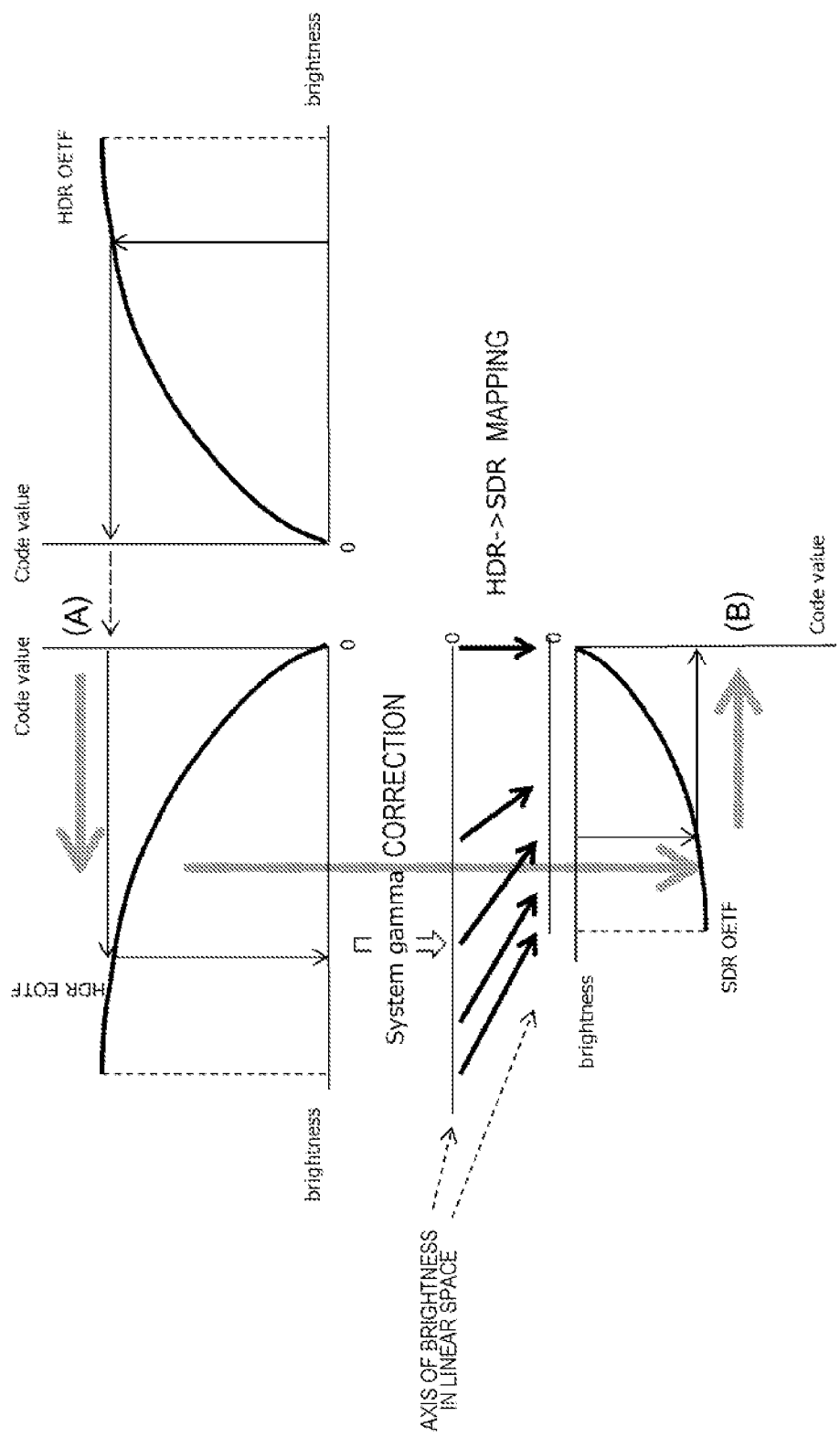
FIG. 12 is a diagram schematically showing dynamic range conversion processing from HDR to SDR.

FIG. 12 schematically shows dynamic range conversion processing from HDR to SDR. Note that the color space conversion is omitted in the illustrated example. (A) obtained by converting brightness of linear optical space into a transmission value by the HDR OETF characteristic exists in a range of the HDR brightness level, for example, 0 to 1000 cd/m².

(A) is converted by HDR EOTF, and further corrected by system gamma to obtain a maximum value of 1000 cd/m² in a linear light ray space. The SDR OETF characteristic is applied to the brightness obtained by applying predetermined HDR/SDR mapping to the value to obtain a value of the SDR characteristic (B). Note that although detailed description is omitted, the dynamic range conversion processing from HDR to HDR-low is similar to the dynamic range conversion processing from HDR to SDR.

Returning to FIG. 5, the container encoder 104 generates the container including the first encoded stream and the second encoded stream generated by the video encoder 103, here, an MP4 stream, as a delivery stream STM. In this case, the MP4 stream including the first encoded stream and the MP4 stream including the second encoded stream are generated. The delivery stream STM of MP4 obtained by the container encoder 105 in this manner is transmitted to the service receiver 200 on a broadcast wave or a net packet.

Figure 13:
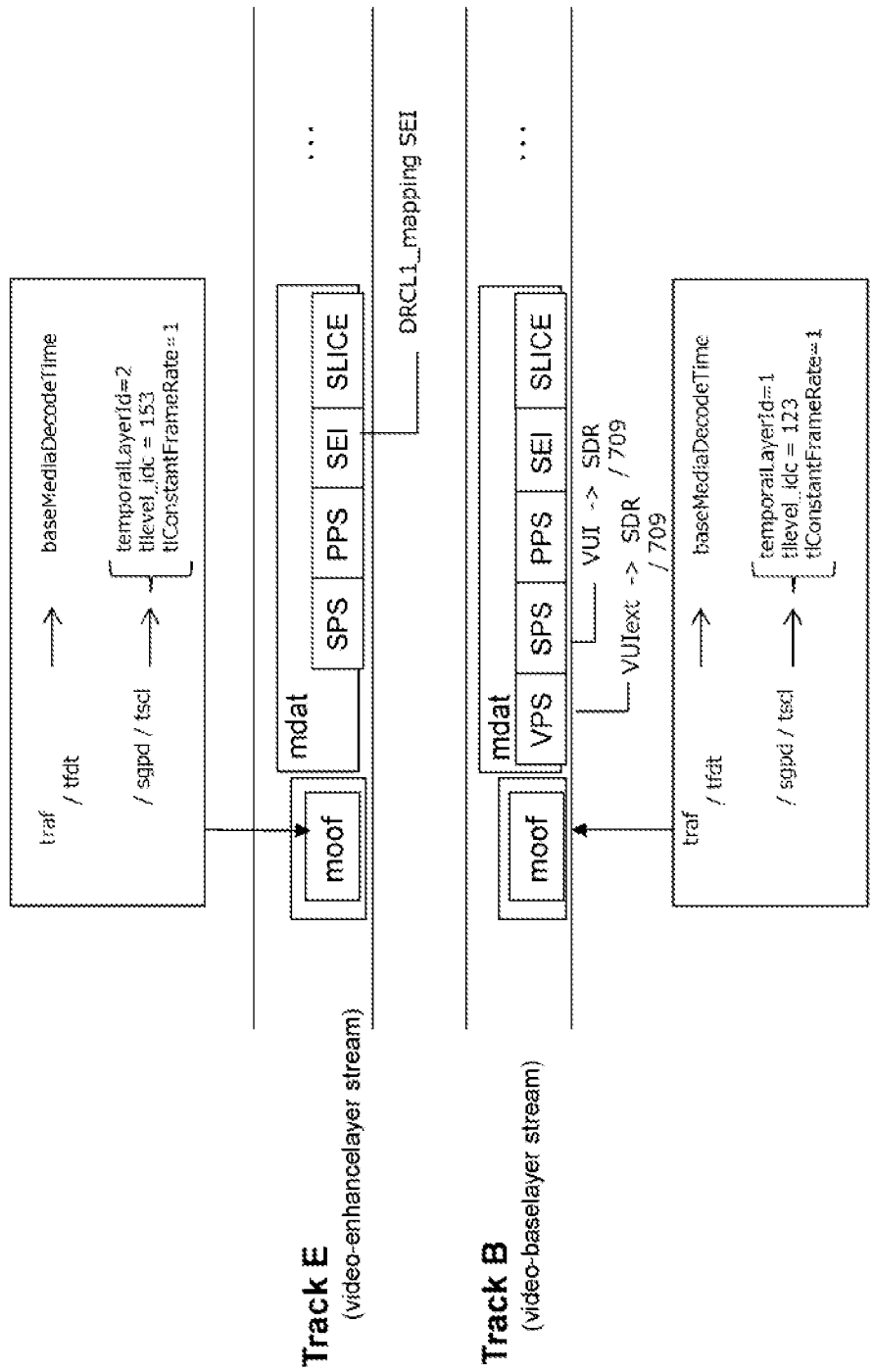
FIG. 13 is a diagram showing a configuration example of an MP4 stream in a case where conversion to HDR/color gamut is performed outside the codec.

FIG. 13 shows a configuration example of the MP4 stream including data of a track B of the base layer and a track E of the enhanced layer in a case where conversion to HDR/color gamut is performed outside the codec (corresponding to the second and fourth layer decomposition described above). The illustrated example is an example of a case of fragmented MP4.

In the MP4 stream, a predetermined number of movie fragments including a "moof" box containing control information and an "mdat" box containing a media data body are arranged. Since the "mdat" box contains fragments obtained by fragmenting the track data, the control information contained in the "moof" box is control information regarding the fragments.

In the MP4 stream corresponding to the track B "video-baselayer stream", the encoded image data (access unit) of the image data of each picture of the base layer is arranged for a predetermined number of pictures, for example, 1 GOP in the "mdat" box of each movie fragment. Here, each access unit includes NAL units such as "VPS", "SPS", "PPS", "SEI", and "SLICE." Note that "VPS" and "SPS" are inserted, for example, in the top picture of the GOP. "VUI" of "SPS" indicates information of the dynamic range/color gamut of the base layer, which is SDR/709 here. Meanwhile, "VUIext" of "VPS" indicates information of the dynamic range/color gamut of the enhanced layer, which is SDR/709 here.

A "traf" box exists in the "moof" box of each movie fragment, and a "tfdt" box exists in the box. In this "tfdt" box, the decode time "baseMediaDecodeTime" of the first access unit after the "moof" box is described.

Meanwhile, the "tfdt" box exists in the "moof" box, a "sgpd" box exists therein, and moreover, a "tscl" box exits therein. In this "tscl" box, parameters of "temporalLayerId", "tllevel_idc", and "tlConstantFrameRate" are described. "temporalLayerId" indicates a temporal ID (temporal_id), and is "1" here. "tlConstantFrameRate" is set at "1", indicating that the frame rate is constant. "tllevel_idc" indicates the level of the base video stream STb, and is "123" here.

In the MP4 stream "video-enhancelayer stream" corresponding to the track E, the encoded image data (access unit) of the image data of each picture of the enhanced layer is arranged for a predetermined number of pictures, for example, 1 GOP in the "mdat" box of each movie fragment. Here, each access unit includes NAL units such as "SPS", "PPS", "SEI", and "SLICE." Note that "SPS" is inserted, for example, in the top picture of the GOP.

As one SEI message, the SEI message including the metadata "DRCL1_mapping" (see FIG. 8(a)) for converting the dynamic range from SDR to HDR is inserted into "SEI." This SEI message converts SDR after decoding into HDR, and the HDR receiver performs conversion into HDR for display. The SDR receiver can ignore this SEI message.

A "traf" box exists in the "moof" box of each movie fragment, and a "tfdt" box exists in the box. In this "tfdt" box, the decode time "baseMediaDecodeTime" of the first access unit after the "moof" box is described.

Meanwhile, the "tfdt" box exists in the "moof" box, a "sgpd" box exists therein, and moreover, a "tscl" box exits therein. In this "tscl" box, parameters of "temporalLayerId", "tllevel_idc", and "tlConstantFrameRate" are described. "temporalLayerId" indicates a temporal ID (temporal_id), and is "2" here. "tlConstantFrameRate" is set at "1", indicating that the frame rate is constant. "tllevel_idc" indicates the level of the base video stream STb, and is "153" here.

Figure 14:
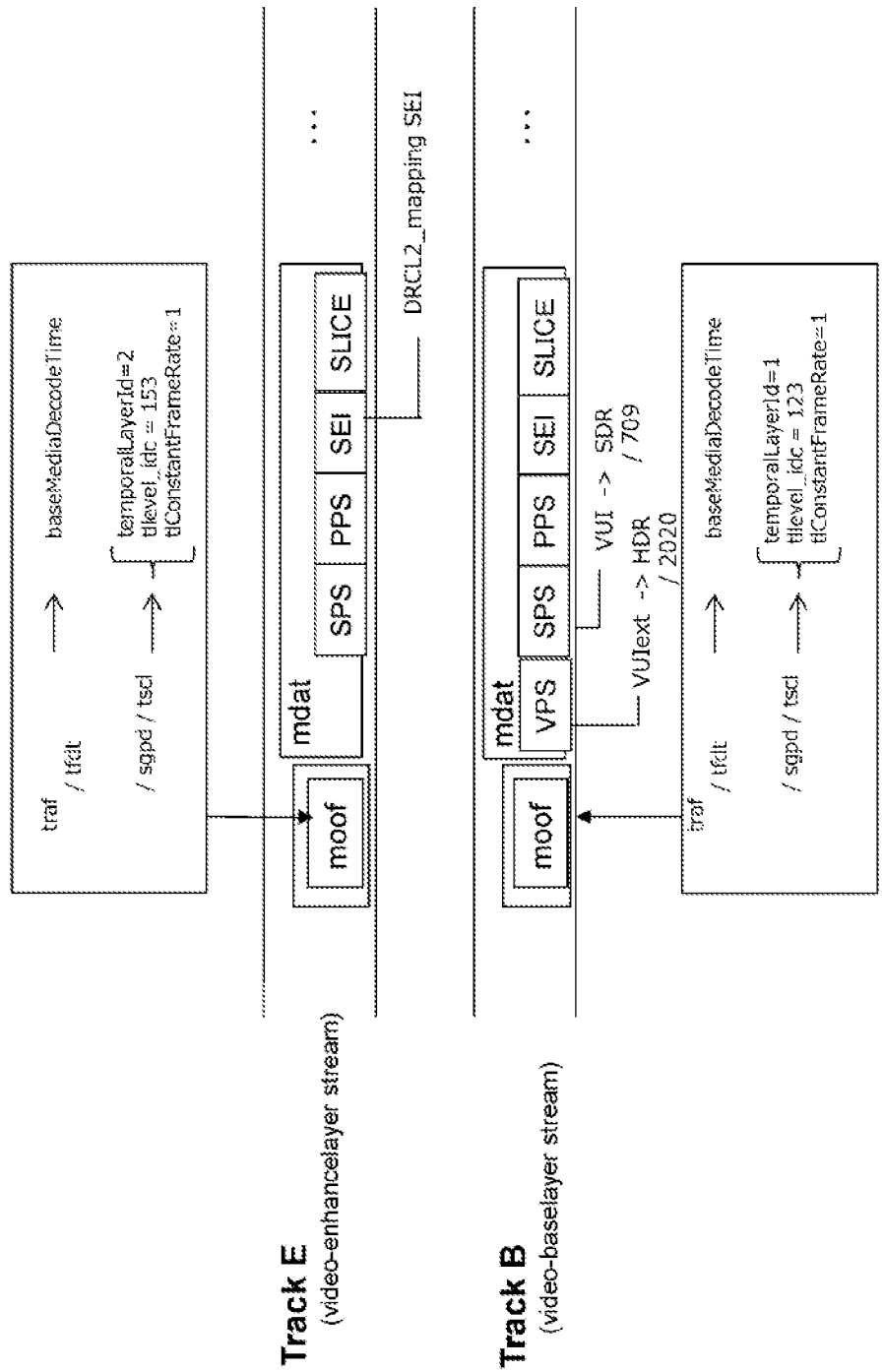
FIG. 14 is a diagram showing the configuration example of the MP4 stream in a case where HDR/color gamut scalable is performed inside the codec.

FIG. 14 shows a configuration example of the MP4 stream including data of the track B of the base layer and the track E of the enhanced layer in a case where HDR/color gamut scalable is performed inside the codec (corresponding to the first, third, and fifth layer decomposition described above). The illustrated example is an example of a case of fragmented MP4.

In the MP4 stream, a predetermined number of movie fragments including a "moof" box containing control information and an "mdat" box containing a media data body are arranged. Since the "mdat" box contains fragments obtained by fragmenting the track data, the control information contained in the "moof" box is control information regarding the fragments.

In the MP4 stream corresponding to the track B "video-baselayer stream", the encoded image data (access unit) of the image data of each picture of the base layer is arranged for a predetermined number of pictures, for example, 1 GOP in the "mdat" box of each movie fragment. Here, each access unit includes NAL units such as "VPS", "SPS", "PPS", "SEI", and "SLICE." Note that "VPS" and "SPS" are inserted, for example, in the top picture of the GOP. "VUI" of "SPS" indicates information of the dynamic range/color gamut of the base layer, which is SDR/709 here. Meanwhile, "VUIext" of "VPS" indicates information of the dynamic range/color gamut of the enhanced layer, which is HDR/2020 here.

A "traf" box exists in the "moof" box of each movie fragment, and a "tfdt" box exists in the box. In this "tfdt" box, the decode time "baseMediaDecodeTime" of the first access unit after the "moof" box is described.

Meanwhile, the "tfdt" box exists in the "moof" box, a "sgpd" box exists therein, and moreover, a "tscl" box exits therein. In this "tscl" box, parameters of "temporalLayerId", "tllevel_idc", and "tlConstantFrameRate" are described. "temporalLayerId" indicates a temporal ID (temporal_id), and is "1" here. "tlConstantFrameRate" is set at "1", indicating that the frame rate is constant. "tllevel_idc" indicates the level of the base video stream STb, and is "123" here.

In the MP4 stream "video-enhancelayer stream" corresponding to the track E, the encoded image data (access unit) of the image data of each picture of the enhanced layer is arranged for a predetermined number of pictures, for example, 1 GOP in the "mdat" box of each movie fragment. Here, each access unit includes NAL units such as "SPS", "PPS", "SEI", and "SLICE." Note that "SPS" is inserted, for example, in the top picture of the GOP.

As one SEI message, the SEI message including the metadata "DRCL2_mapping" (see FIG. 8(b)) for converting the dynamic range from HDR to HDR-low is inserted into "SEI." This SEI message is supplied for the receiver of HDR-low display. The receiver of HDR-low display converts the HDR of the decoder (base+enhance) output into HDR-low for display by using this metadata "DRCL2_mapping." The HDR receiver can ignore this SEI message.

A "traf" box exists in the "moof" box of each movie fragment, and a "tfdt" box exists in the box. In this "tfdt" box, the decode time "baseMediaDecodeTime" of the first access unit after the "moof" box is described.

Meanwhile, the "tfdt" box exists in the "moof" box, a "sgpd" box exists therein, and moreover, a "tscl" box exits therein. In this "tscl" box, parameters of "temporalLayerId", "tllevel_idc", and "tlConstantFrameRate" are described. "temporalLayerId" indicates a temporal ID (temporal_id), and is "2" here. "tlConstantFrameRate" is set at "1", indicating that the frame rate is constant. "tllevel_idc" indicates the level of the base video stream STb, and is "153" here.

Returning to FIG. 5, the service receiver 200 includes a controller 201, a container decoder 202, a video decoder 203, a converter 204, and an HDR or SDR electro-optical conversion unit 205. The controller 201 controls an operation of each unit of the service receiver 200.

According to display capability of the service receiver 200, the container decoder 202 selectively extracts only the first encoded stream or both the first encoded stream and the second encoded stream from the received delivery stream STM of MP4 for transmission to the video decoder 203.

The video decoder 203 performs decoding processing on the encoded stream extracted selectively by the container decoder 202 to obtain SDR or HDR image data. Also, the video decoder 203 extracts a parameter set or SEI message inserted in the encoded stream extracted selectively by the container decoder 202 for transmission to the controller 201.

The extracted information also includes the SEI message including VUI information inserted in the SPS NAL unit area of the access unit described above, VUIext information inserted in the VPS NAL unit area, the metadata "DRCL1_mapping" for converting the dynamic range from SDR to HDR, or the metadata "DRCL2_mapping" for converting the dynamic range from HDR to HDR-low.

According to the display capability of the service receiver 200, the converter 204 converts the dynamic range from SDR to HDR, or the dynamic range from HDR to SDR (HDR-low), on the basis of the metadata "DRCL1_mapping" or the metadata "DRCL2_mapping." The electro-optical conversion unit 205 applies electro-optical conversion characteristics corresponding to the input HDR or SDR (HDR-low) image data on the image data to obtain display image data Vdsp.

Next, details of configurations of parts of the video encoder 103 and the container encoder 104 on the service transmission system 100 side, and the container decoder 202, the video decoder 203, and the converter 204 on the service receiver 200 side in FIG. 5 will be described.

Figure 15:
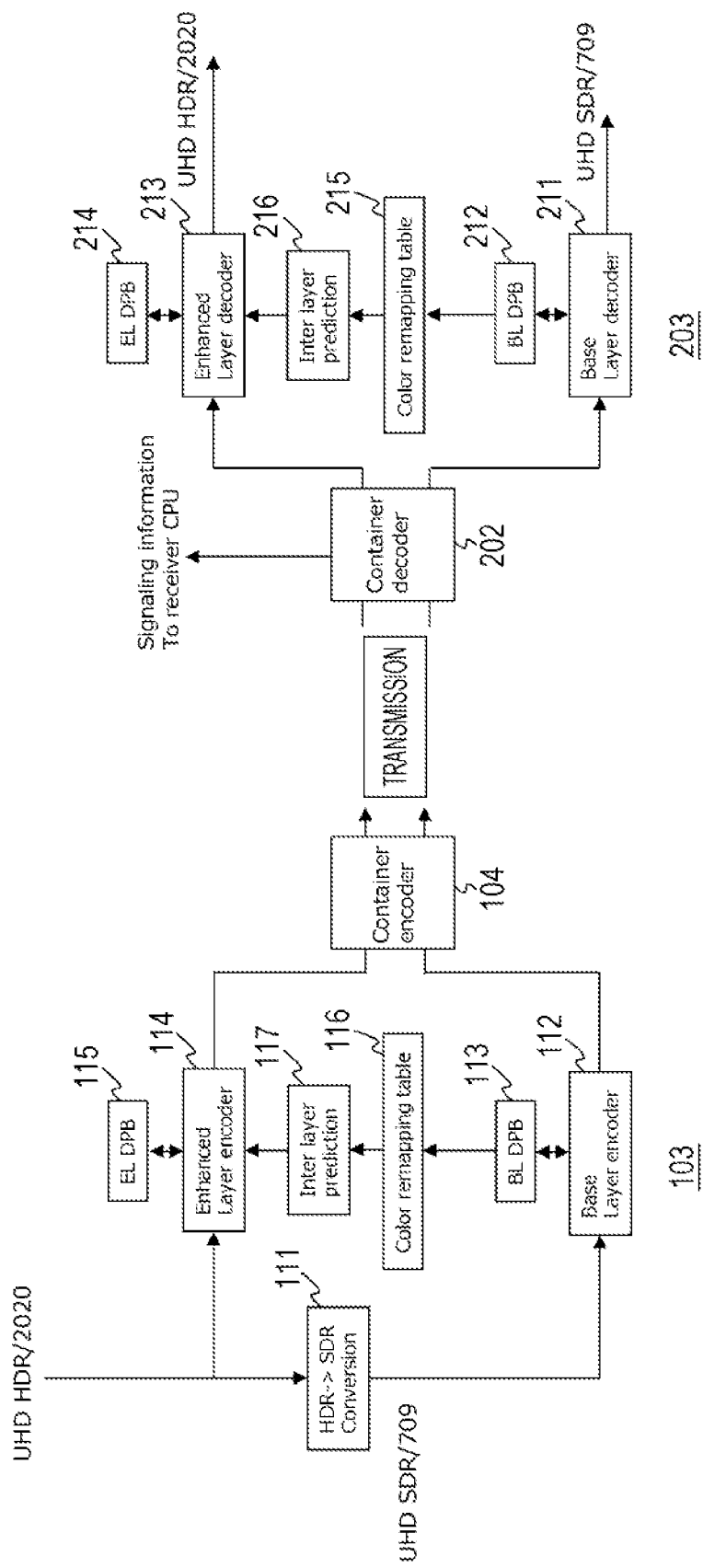
FIG. 15 is a diagram showing a detailed configuration example of a transmission side and a reception side of the transmission-reception system in a case of first layer decomposition.

FIG. 15 shows a configuration example of the above-described first layer decomposition (see FIG. 4(a)). In FIG. 15, parts corresponding to parts in FIG. 5 are shown with the same reference signs. In this case, the converter 204 does not exist on the service receiver 200 side.

Image data of UHD HDR/2020 is input to a conversion unit 111 and converted into image data of UHD SDR/709. The image data of UHD SDR/709 is image data of each picture of the base layer, and is encoded by a base layer encoder 112 to generate the first encoded stream.

Furthermore, the image data of each picture of the base layer obtained by decoding the first encoded stream is temporarily stored in a base layer decoded picture buffer (BL DPB) 113, and is used for predictive encoding within the layer and between layers.

Furthermore, the image data of UHD HDR/2020 is encoded by an enhanced layer encoder 114 to generate the second encoded stream. Furthermore, the image data of each picture of the enhanced layer obtained by decoding the second encoded stream is temporarily stored in an enhanced layer decoded picture buffer (EL DPB) 115, and is used for predictive encoding within the layer.

In this case, the image data of the corresponding picture is read from the base layer decoded picture buffer 113, and the dynamic range and the color gamut of the image data are converted from SDR/709 to HDR/2020 by a color remapping table 116 and sent to an inter layer prediction circuit 117. With this arrangement, in the enhanced layer encoder 114, predictive encoding between layers is also performed as appropriate.

In the container encoder 104, the MP4 stream including the first encoded stream generated by the base layer encoder 112 and the second encoded stream generated by the enhanced layer encoder 114 is generated as the delivery stream STM.

In a case where the service receiver 200 has only UHD SDR display capability, in the container decoder 202, only the first encoded stream is extracted from the received delivery stream STM of MP4 and sent to a base layer decoder 211. Note that in the container decoder 202, signaling information of the MP4 stream is extracted and sent to the controller (receiver CPU) 201.

In the base layer decoder 211, the first encoded stream is subjected to decoding processing to obtain image data of UHD SDR/709. Furthermore, the image data is temporarily stored in the base layer decoded picture buffer (BL DPB) 212, and is used for predictive compensation within the layer. Furthermore, in the base layer decoder 211, the parameter set or SEI message inserted in the first encoded stream are extracted and sent to the controller 201 for use.

Furthermore, in a case where the service receiver 200 has UHD HDR display capability, in the container decoder 202, both the first encoded stream and the second encoded stream are extracted from the received delivery stream STM of MP4. This first encoded stream is sent to the base layer decoder 211 and subjected to decoding processing. In the base layer decoded picture buffer 212, the image data of each picture of the base layer obtained by decoding is temporarily stored, and is used for predictive compensation within the layer and between layers.

Furthermore, the second encoded stream extracted by the container decoder 202 is sent to an enhanced layer decoder 213 and subjected to decoding processing to obtain the image data of UHD HDR/2020. Furthermore, the image data is temporarily stored in the enhanced layer decoded picture buffer (EL DPB) 214, and is used for predictive compensation within the layer.

Furthermore, the image data of the corresponding picture is read from the base layer decoded picture buffer 212, and the dynamic range and the color gamut of the image data are converted from SDR/709 to HDR/2020 by a color remapping table 215 and sent to an inter layer prediction circuit 216. With this arrangement, in the enhanced layer decoder 213, predictive compensation between layers is also performed as appropriate.

Figure 16:
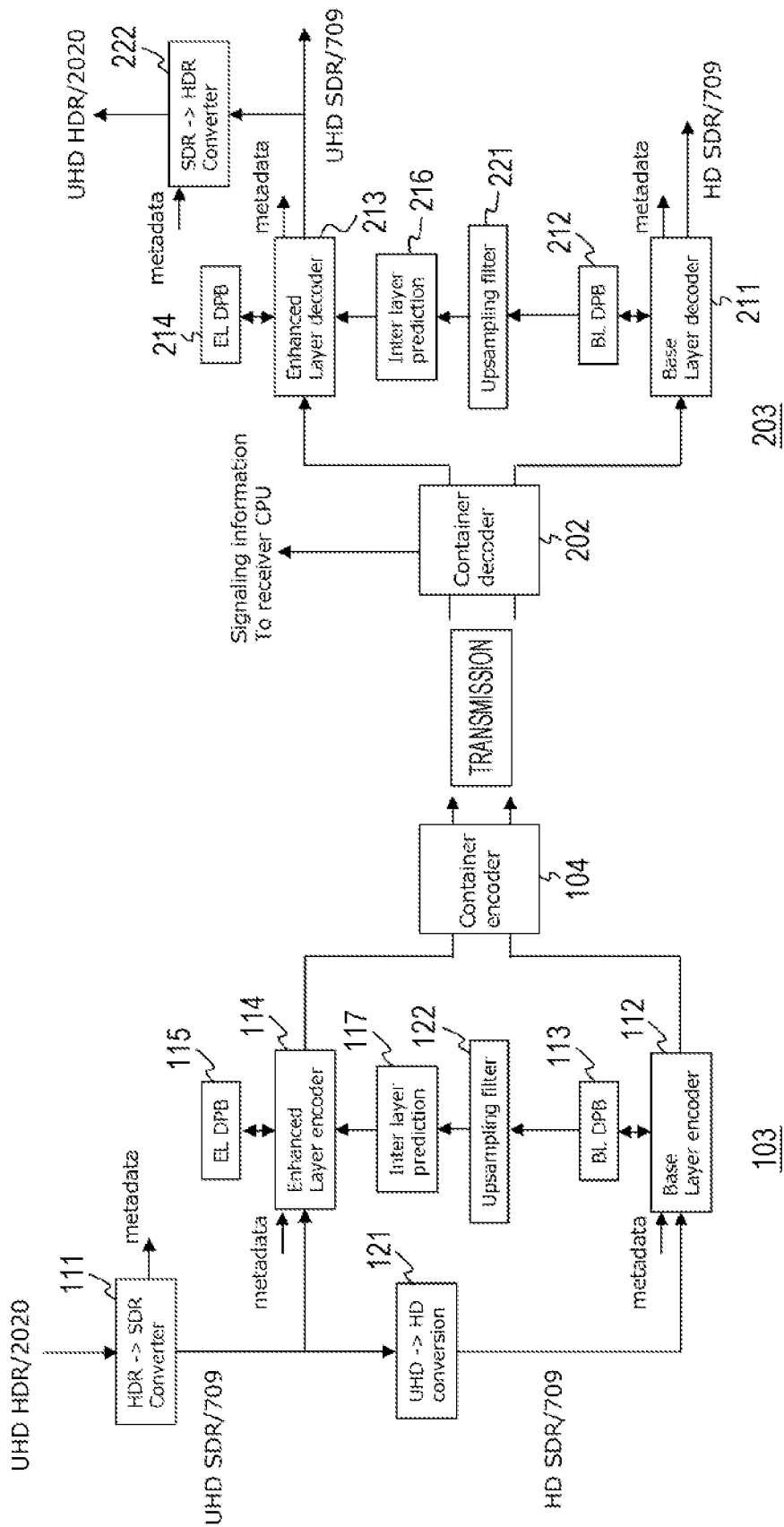
FIG. 16 is a diagram showing a detailed configuration example of the transmission side and the reception side of the transmission-reception system in a case of second layer decomposition.

FIG. 16 shows a configuration example in a case of second layer decomposition described above (see FIG. 4(*b*)). In FIG. 16, parts corresponding to parts in FIGS. 5 and 15 are shown with the same reference signs.

Image data of UHD HDR/2020 is input to a conversion unit 111 and converted into image data of UHD SDR/709. Here, from this conversion unit 111, the metadata "DRCL1_mapping" for converting the dynamic range from SDR to HDR is obtained.

The image data of UHD SDR/709 obtained by the conversion unit 111 is input to a conversion unit 121 and converted into image data of HD SDR/709. The image data of HD SDR/709 is image data of each picture of the base layer, and is encoded by the base layer encoder 112 to generate the first encoded stream.

In the base layer encoder 112, as one SEI message, an SEI message including the metadata "1_mapping" for converting the dynamic range from SDR to HDR is inserted into "SEI" of the first encoded stream.

Furthermore, the image data of each picture of the base layer obtained by decoding the first encoded stream is temporarily stored in the base layer decoded picture buffer 113, and is used for predictive encoding within the layer and between layers.

Furthermore, the image data of UHD SDR/709 obtained by the conversion unit 111 is encoded by the enhanced layer encoder 114 to generate the second encoded stream.

In the enhanced layer encoder 114, as one SEI message, the SEI message including the metadata "DRCL1_mapping" for converting the dynamic range from SDR to HDR is inserted into "SEI" of the second encoded stream. Note that this metadata "DRCL1_mapping" is required at least to be inserted into either the first encoded stream or the second encoded stream.

Furthermore, the image data of each picture of the enhanced layer obtained by decoding the second encoded stream is temporarily stored in the enhanced layer decoded picture buffer 115, and is used for predictive encoding within the layer.

Furthermore, the image data of the corresponding picture is read from the base layer decoded picture buffer 113, and resolution of the image data is converted from HD to UHD by an upsampling filter 122 and sent to the inter layer prediction circuit 117. With this arrangement, in the enhanced layer encoder 114, predictive encoding between layers is also performed as appropriate.

In the container encoder 104, the MP4 stream including the first encoded stream generated by the base layer encoder 112 and the second encoded stream generated by the enhanced layer encoder 114 is generated as the delivery stream STM.

In a case where the service receiver 200 has only HD SDR display capability, in the container decoder 202, only the first encoded stream is extracted from the received delivery stream STM of MP4 and sent to the base layer decoder 211.

Note that in the container decoder 202, signaling information of the MP4 stream is extracted and sent to the controller 201.

In the base layer decoder 211, decoding processing is performed on the first encoded stream and the image data of HD SDR/709 is obtained. Furthermore, the image data is temporarily stored in the base layer decoded picture buffer 212, and is used for predictive compensation within the layer. Furthermore, in the base layer decoder 211, the parameter set or SEI message inserted in the first encoded stream are extracted and sent to the controller 201 for use.

Furthermore, in a case where the service receiver 200 has UHD SDR display capability, in the container decoder 202, both the first encoded stream and the second encoded stream are extracted from the received delivery stream STM of MP4. This first encoded stream is sent to the base layer decoder 211 and subjected to decoding processing. In the base layer decoded picture buffer 212, the image data of each picture of the base layer obtained by decoding is temporarily stored, and is used for predictive compensation within the layer and between layers.

Furthermore, the second encoded stream extracted by the container decoder 202 is sent to the enhanced layer decoder 213 and subjected to decoding processing to obtain the image data of UHD SDR/709. Furthermore, the image data is temporarily stored in the enhanced layer decoded picture buffer 214, and is used for predictive compensation within the layer.

In this case, the image data of the corresponding picture is read from the base layer decoded picture buffer 212, the resolution of the image data is converted from HD to UHD by a sampling filter (upsampling filter) 221 and sent to the inter layer prediction circuit 216. With this arrangement, in the enhanced layer decoder 213, predictive compensation between layers is also performed as appropriate.

Furthermore, in a case where the service receiver 200 has UHD HDR display capability, as described above, the image data of UHD SDR/709 obtained by the enhanced layer decoder 213 is converted by the conversion unit 222 on the basis of the metadata "DRCL1_mapping" extracted by the base layer decoder 211 or the enhanced layer decoder 213 for converting the dynamic range from SDR to HDR, and the image data of UHD HDR/2020 is obtained.

Figure 17:
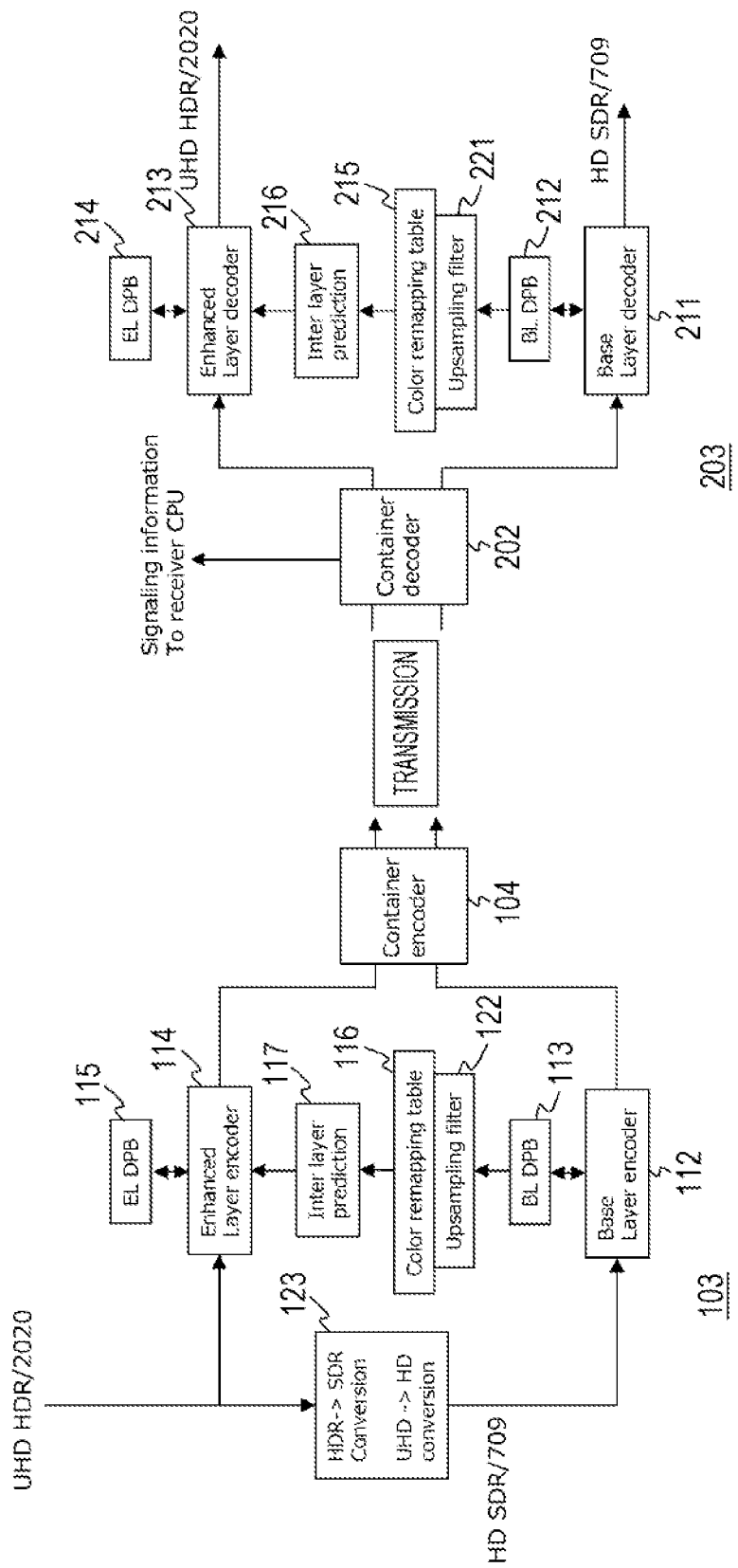
FIG. 17 is a diagram showing a detailed configuration example of the transmission side and the reception side of the transmission-reception system in a case of third layer decomposition.

FIG. 17 shows a configuration example in a case of third layer decomposition described above (see FIG. 4(*c*)). In FIG. 17, parts corresponding to parts in FIGS. 5, 15, and 16 are shown with the same reference signs.

Image data of UHD HDR/2020 is input to a conversion unit 123 and converted into image data of HD SDR/709. The image data of HD SDR/709 is image data of each picture of the base layer, and is encoded by the base layer encoder 112 to generate the first encoded stream.

Furthermore, the image data of each picture of the base layer obtained by decoding the first encoded stream is temporarily stored in the base layer decoded picture buffer 113, and is used for predictive encoding within the layer and between layers.

Furthermore, the image data of UHD HDR/2020 is encoded by the enhanced layer encoder 114 to generate the second encoded stream. Furthermore, the image data of each picture of the enhanced layer obtained by decoding the second encoded stream is temporarily stored in an enhanced layer decoded picture buffer (EL DPB) 115, and is used for predictive encoding within the layer.

In this case, the image data of the corresponding picture is read from the base layer decoded picture buffer 113, the resolution of this image data is converted from HD to UHD by the upsampling filter 122, and the dynamic range and the color gamut are converted from SDR/709 to HDR/2020 by the color remapping table 116 and sent to the inter layer prediction circuit 117. With this arrangement, in the enhanced layer encoder 114, predictive encoding between layers is also performed as appropriate.

In the container encoder 104, the MP4 stream including the first encoded stream generated by the base layer encoder 112 and the second encoded stream generated by the enhanced layer encoder 114 is generated as the delivery stream STM.

In a case where the service receiver 200 has only HD SDR display capability, in the container decoder 202, only the first encoded stream is extracted from the received delivery stream STM of MP4 and sent to the base layer decoder 211. Note that in the container decoder 202, signaling information of the MP4 stream is extracted and sent to the controller 201.

In the base layer decoder 211, decoding processing is performed on the first encoded stream and the image data of HD SDR/709 is obtained. Furthermore, the image data is temporarily stored in the base layer decoded picture buffer 212, and is used for predictive compensation within the layer. Furthermore, in the base layer decoder 211, the parameter set or SEI message inserted in the first encoded stream are extracted and sent to the controller 201 for use.

Furthermore, in a case where the service receiver 200 has UHD HDR display capability, in the container decoder 202, both the first encoded stream and the second encoded stream are extracted from the received delivery stream STM of MP4. This first encoded stream is sent to the base layer decoder 211 and subjected to decoding processing. In the base layer decoded picture buffer 212, the image data of each picture of the base layer obtained by decoding is temporarily stored, and is used for predictive compensation within the layer and between layers.

Furthermore, the second encoded stream extracted by the container decoder 202 is sent to an enhanced layer decoder 213 and subjected to decoding processing to obtain the image data of UHD HDR/2020. Furthermore, the image data is temporarily stored in the enhanced layer decoded picture buffer 214, and is used for predictive compensation within the layer.

Furthermore, the image data of the corresponding picture is read from the base layer decoded picture buffer 212, the resolution of this image data is converted from HD to UHD by the upsampling filter 221, and the dynamic range and the color gamut of the image data are further converted from SDR/709 to HDR/2020 by the color remapping table 215 and sent to the inter layer prediction circuit 216. With this arrangement, in the enhanced layer decoder 213, predictive compensation between layers is also performed as appropriate.

Figure 18:
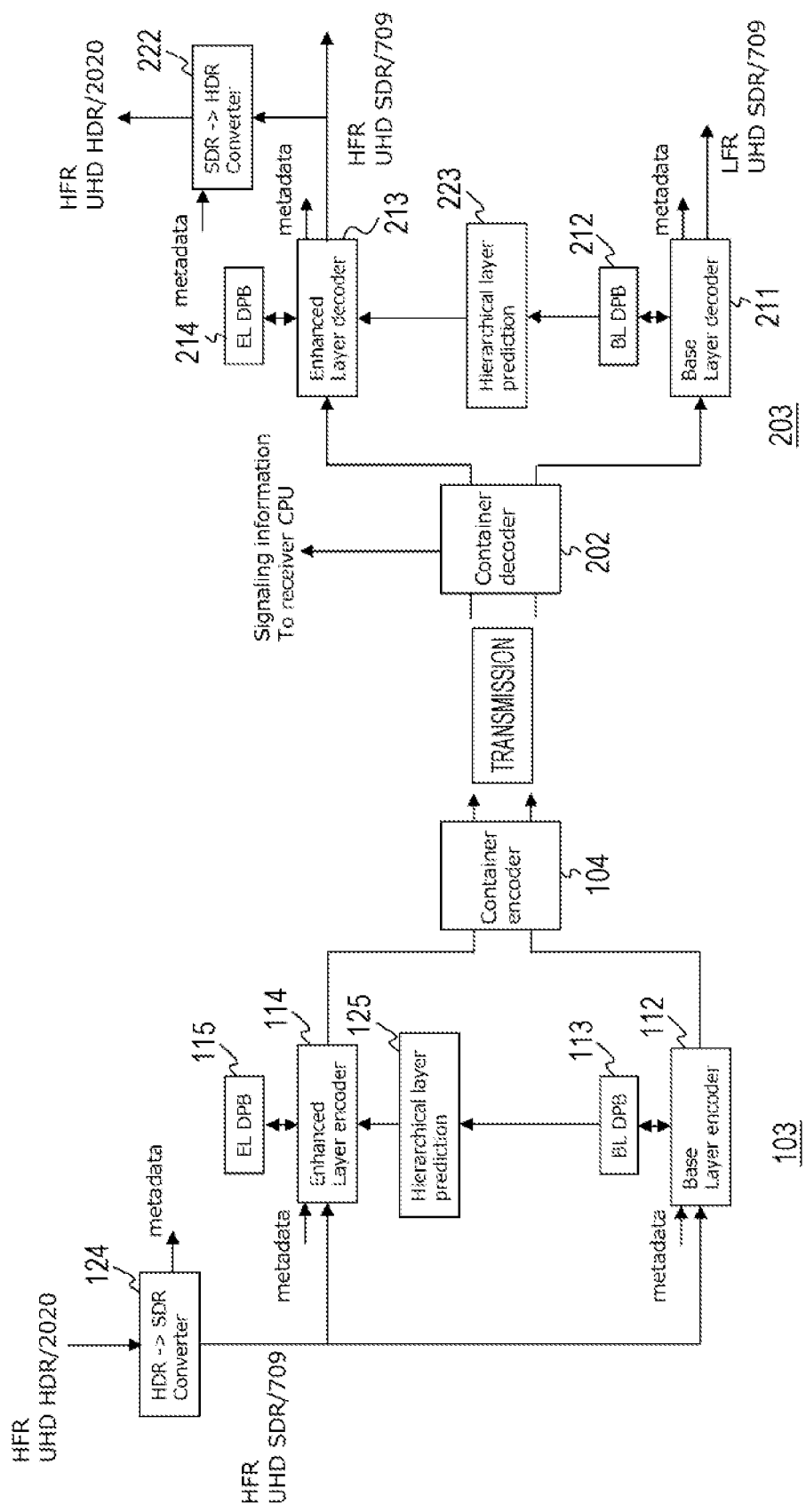
FIG. 18 is a diagram showing a detailed configuration example of the transmission side and the reception side of the transmission-reception system in a case of fourth layer decomposition.

FIG. 18 shows a configuration example in a case of fourth layer decomposition described above (see FIG. 4(d)). In FIG. 18, parts corresponding to parts in FIGS. 5, and 15 to 17 are shown with the same reference signs.

Image data of HFR UHD HDR/2020 is input to a conversion unit 124 and converted into image data of HFR UHD SDR/709. Here, from this conversion unit 111, the metadata "DRCL1_mapping" for converting the dynamic range from SDR to HDR is obtained.

The image data of HFR (120 P) UHD SDR/709 obtained by the conversion unit 111 is input to the base layer encoder 112, only pictures of the frame rate of NFR (60 P) are hierarchically classified into the base layer, encoded by the base layer encoder 112, and the first encoded stream is generated.

In the base layer encoder 112, as one SEI message, an SEI message including the metadata "DRCL1_mapping" for converting the dynamic range from SDR to HDR is inserted into "SEI" of the first encoded stream.

Furthermore, the image data of each picture of the base layer obtained by decoding the first encoded stream is temporarily stored in the base layer decoded picture buffer 113, and is used for predictive encoding within the layer and between layers.

Furthermore, the image data of HFR (120 P) UHD SDR/709 obtained by the conversion unit 124 is encoded by the enhanced layer encoder 114 to generate the second encoded stream.

In the enhanced layer encoder 114, as one SEI message, the SEI message including the metadata "DRCL1_mapping" for converting the dynamic range from SDR to HDR is inserted into "SEI" of the second encoded stream. Note that this metadata "DRCL1_mapping" is required at least to be inserted into either the first encoded stream or the second encoded stream.

Furthermore, the image data of each picture of the enhanced layer obtained by decoding the second encoded stream is temporarily stored in the enhanced layer decoded picture buffer 115, and is used for predictive encoding within the layer.

Furthermore, the image data of the corresponding picture is read from the base layer decoded picture buffer 113 and sent to a hierarchical layer prediction circuit 125. With this arrangement, in the enhanced layer encoder 114, predictive encoding between layers is also performed as appropriate.

In the container encoder 104, the MP4 stream including the first encoded stream generated by the base layer encoder 112 and the second encoded stream generated by the enhanced layer encoder 114 is generated as the delivery stream STM.

In a case where the service receiver 200 has only LFR UHD SDR display capability, in the container decoder 202, only the first encoded stream is extracted from the received delivery stream STM of MP4 and sent to the base layer decoder 211. Note that in the container decoder 202, signaling information of the MP4 stream is extracted and sent to the controller 201.

In the base layer decoder 211, the first encoded stream is subjected to decoding processing to obtain image data of LFR UHD SDR/709. Furthermore, the image data is temporarily stored in the base layer decoded picture buffer 212, and is used for predictive compensation within the layer. Furthermore, in the base layer decoder 211, the parameter set or SEI message inserted in the first encoded stream are extracted and sent to the controller 201 for use.

Furthermore, in a case where the service receiver 200 has HFR UHD SDR display capability, in the container decoder 202, both the first encoded stream and the second encoded stream are extracted from the received delivery stream STM of MP4. This first encoded stream is sent to the base layer decoder 211 and subjected to decoding processing. In the base layer decoded picture buffer 212, the image data of each picture of the base layer obtained by decoding is temporarily stored, and is used for predictive compensation within the layer and between layers.

Furthermore, the second encoded stream extracted by the container decoder 202 is sent to the enhanced layer decoder 213 and subjected to decoding processing to obtain the image data of HFR UHD SDR/709. Furthermore, the image data is temporarily stored in the enhanced layer decoded picture buffer 214, and is used for predictive compensation within the layer.

In this case, the image data of the corresponding picture is read from the base layer decoded picture buffer 212 and sent to a hierarchical layer prediction circuit 223. With this arrangement, in the enhanced layer decoder 213, predictive compensation between layers is also performed as appropriate.

Furthermore, in a case where the service receiver 200 has HFR UHD HDR display capability, as described above, the image data of HFR UHD SDR/709 obtained by the enhanced layer decoder 213 is converted by the conversion unit 222 on the basis of the metadata "DRCL1_mapping" extracted by the base layer decoder 211 or the enhanced layer decoder 213 for converting the dynamic range from SDR to HDR, and the image data of HFR UHD HDR/2020 is obtained.

Figure 19:
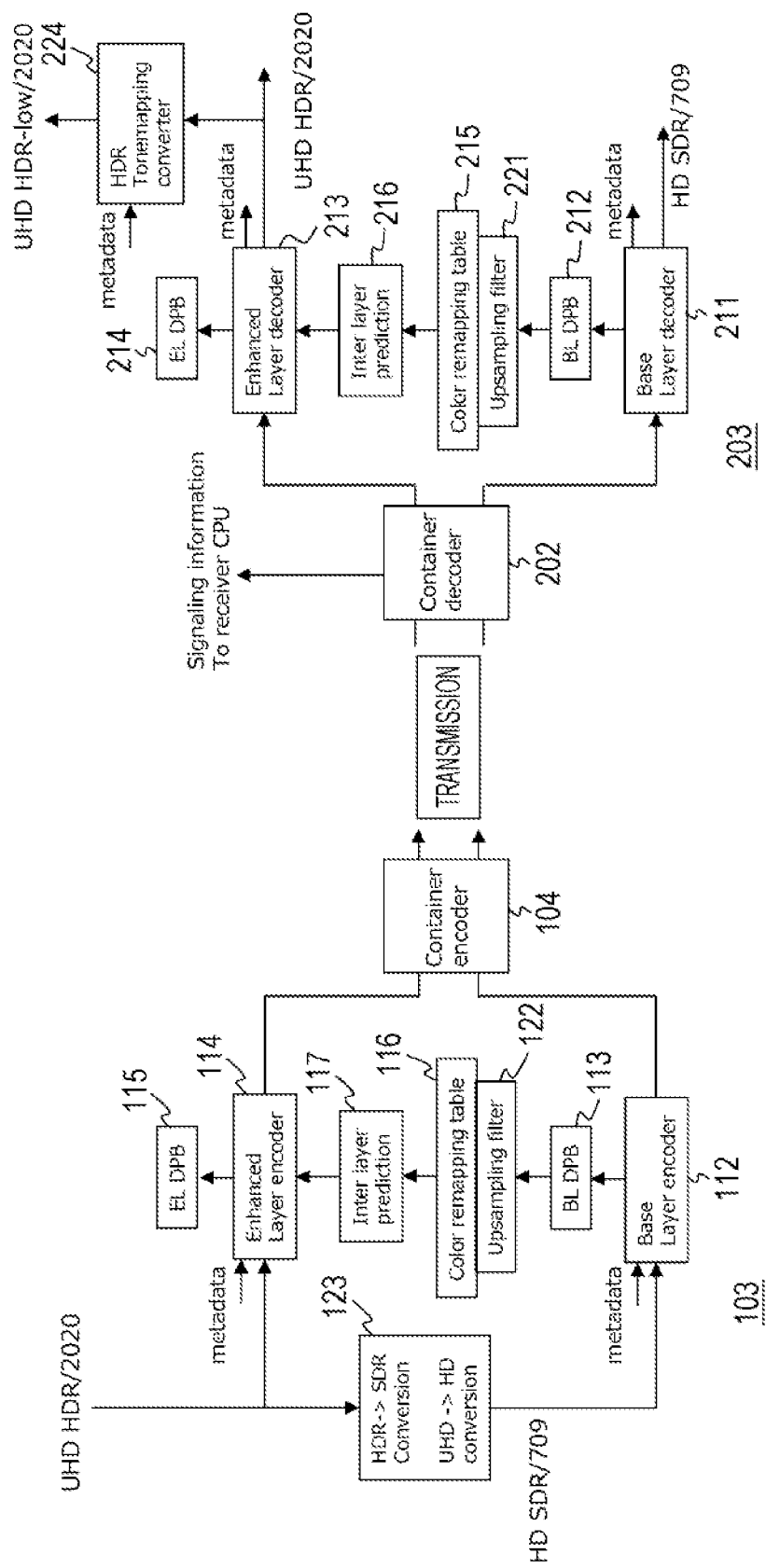
FIG. 19 is a diagram showing a detailed configuration example of the transmission side and the reception side of the transmission-reception system in a case of fifth layer decomposition.

FIG. 19 shows a configuration example in a case of fifth layer decomposition described above (see FIG. 4(e)). In FIG. 19, parts corresponding to parts in FIGS. 5 and 15 to 18 are shown with the same reference signs.

Image data of UHD HDR/2020 is input to a conversion unit 123 and converted into image data of HD SDR/709. The image data of HD SDR/709 is image data of each picture of the base layer, and is encoded by the base layer encoder 112 to generate the first encoded stream.

In the base layer encoder 112, as one SEI message, an SEI message including the metadata "DRCL2_mapping" for converting the dynamic range from HDR to HDR-low is inserted into "SEI" of the first encoded stream.

Furthermore, the image data of each picture of the base layer obtained by decoding the first encoded stream is temporarily stored in the base layer decoded picture buffer 113, and is used for predictive encoding within the layer and between layers.

Furthermore, the image data of UHD HDR/2020 is encoded by the enhanced layer encoder 114 to generate the second encoded stream. In the enhanced layer encoder 114, as one SEI message, an SEI message including the metadata "DRCL2_mapping" for converting the dynamic range from HDR to HDR-low is inserted into "SEI" of the second encoded stream. Note that this metadata "DRCL2_mapping" is required at least to be inserted into either the first encoded stream or the second encoded stream.

Furthermore, the image data of each picture of the enhanced layer obtained by decoding the second encoded stream is temporarily stored in the enhanced layer decoded picture buffer 115, and is used for predictive encoding within the layer.

Furthermore, the image data of the corresponding picture is read from the base layer decoded picture buffer 113, the resolution of this image data is converted from HD to UHD by the upsampling filter 122, and the dynamic range and the color gamut are converted from SDR/709 to HDR/2020 by the color remapping table 116 and sent to the inter layer prediction circuit 117. With this arrangement, in the enhanced layer encoder 114, predictive encoding between layers is also performed as appropriate.

In the container encoder 104, the MP4 stream including the first encoded stream generated by the base layer encoder 112 and the second encoded stream generated by the enhanced layer encoder 114 is generated as the delivery stream STM.

In a case where the service receiver 200 has only HD SDR display capability, in the container decoder 202, only the first encoded stream is extracted from the received delivery stream STM of MP4 and sent to the base layer decoder 211. Note that in the container decoder 202, signaling information of the MP4 stream is extracted and sent to the controller 201.

In the base layer decoder 211, decoding processing is performed on the first encoded stream and the image data of HD SDR/709 is obtained. Furthermore, the image data is temporarily stored in the base layer decoded picture buffer 212, and is used for predictive compensation within the layer. Furthermore, in the base layer decoder 211, the parameter set or SEI message inserted in the first encoded stream are extracted and sent to the controller 201 for use.

Furthermore, in a case where the service receiver 200 has UHD HDR display capability, in the container decoder 202, both the first encoded stream and the second encoded stream are extracted from the received delivery stream STM of MP4. This first encoded stream is sent to the base layer decoder 211 and subjected to decoding processing. In the base layer decoded picture buffer 212, the image data of each picture of the base layer obtained by decoding is temporarily stored, and is used for predictive compensation within the layer and between layers.

Furthermore, the second encoded stream extracted by the container decoder 202 is sent to the enhanced layer decoder 213 and subjected to decoding processing to obtain the image data of UHD HDR/709. Furthermore, the image data is temporarily stored in the enhanced layer decoded picture buffer 214, and is used for predictive compensation within the layer.

In this case, the image data of the corresponding picture is read from the base layer decoded picture buffer 212, the resolution of this image data is converted from HD to UHD by the upsampling filter 221, and the dynamic range and the color gamut of the image data are further converted from SDR/709 to HDR/2020 by the color remapping table 215 and sent to the inter layer prediction circuit 216. With this arrangement, in the enhanced layer decoder 213, predictive compensation between layers is also performed as appropriate.

Furthermore, in a case where the service receiver 200 has UHD HDR-low display capability, as described above, the image data of UHD HDR/2020 obtained by the enhanced layer decoder 213 is converted by the conversion unit 224 on the basis of the metadata "DRCL2_mapping" extracted by the base layer decoder 211 or the enhanced layer decoder 213 for converting the dynamic range from HDR to HDR-low, and the image data of UHD HDR-low/2020 is obtained.

FIGS. 20 to 24 show description examples of MPD files corresponding to the first to fifth layer decompositions described above, respectively. Here, for simplicity of description, examples in which only information regarding the video stream is described are shown, but actually, information regarding other media streams of the video stream is also described. FIG. 25 shows "value" semantics of "SupplementaryDescriptor."

First, the description example of the MPD file of FIG. 20 will be described. The description example of the MPD file corresponds to the first layer decomposition (see FIGS. 4(a) and 15). '<AdaptationSet mimeType="video/mp4" codecs="hev1.xx.xx.L153, xx, hev1.yy.yy.L153, yy"' indicates that the adaptation set (AdaptationSet) for the video stream exits, the video stream is supplied in MP4 file structure, and 153 levels and 153-level HEVC encoded image data exist.

In this MPD file, a first representation corresponding to the first encoded stream having the encoded image data of each picture of the base layer exists, and a first representation corresponding to the second encoded stream having the encoded image data of each picture of the enhanced layer exists.

In the first representation, the description '<SupplementaryDescriptor schemeIdUri="urn: brdcst: video: codeddynamicrange" value="0"/>' indicates that the dynamic range of the encoded video is "SDR." The description '<SupplementaryDescriptor schemeIdUri="urn: brdcst: video: codedtransferfunction" value="0"/>' indicates that the EOTF type of the encoded video is "gamma." The description '<SupplementaryDescriptor schemeIdUri="urn: brdcst: video: codedxycolourprimaries" value="0"/>' indicates that the color primary of the encoded video is "709."

Furthermore, the description 'width="3840" height="2160" frameRate="60"', 'codecs="hev1.xx.xx.L153, xx"', 'level="0"' indicates that the stream of UHD (4K) 60 P is implemented, the level "0" is given as tag information, and the level of the first encoded stream having the encoded image data of each picture of the base layer is "153." Furthermore, the description '<BaseURL>videostreamBase.mp4</BaseURL>' indicates that the location destination of the first video stream is "videostreamBase.mp4."

Furthermore, in the second representation, the description '<SupplementaryDescriptor schemeIdUri="urn: brdcst: video: codeddynamicrange" value="1"/>' indicates that the dynamic range of the encoded video is "HDR." The description '<SupplementaryDescriptor schemeIdUri="urn: brdcst: video: codedtransferfunction" value="2"/>' indicates that the EOTF type of the encoded video is "PQ." The description '<SupplementaryDescriptor schemeIdUri="urn: brdcst: video: codedxycolourprimaries" value="1"/>' indicates that the color primary of the encoded video is "2020."

Furthermore, the description 'width="3840" height="2160" frameRate="60"', 'codecs="hev1.xx.xx.L153, xx"', 'level="1"', 'dependencyLevel="0"' indicates that the stream of UHD (4K) 60 P is implemented by enhancement on the first encoded stream, the level "1" is given as tag information, and the level of the second encoded stream having the encoded image data of each picture of the enhanced layer is "153." Furthermore, the description '<BaseURL>videostreamEnhanced.mp4 </BaseURL>' indicates that the location destination of the first video stream is "videostreamEnhanced.mp4."

Next, the description example of the MPD file of FIG. 21 will be described. The description example of the MPD file corresponds to the second layer decomposition (see FIGS. 4(b) and 16). '<AdaptationSet mimeType="video/mp4" codecs="hev1.xx.xx.L123, xx, hev1.yy.yy.L153, yy"' indicates that the adaptation set (AdaptationSet) for the video stream exits, the video stream is supplied in MP4 file structure, and 123 levels and 153-level HEVC encoded image data exist.

The description '<SupplementaryDescriptor schemeIdUri="urn: brdcst: video: codeddynamicrange" value="0"/>' indicates that the dynamic range of the encoded video is "SDR." The description '<SupplementaryDescriptor schemeIdUri="urn: brdcst: video: coded-transferfunction" value="0"/>' indicates that the EOTF type of the encoded video is "gamma." The description '<SupplementaryDescriptor schemeIdUri="urn: brdcst: video: codedxycolourprimaries" value="0"/>' indicates that the color primary of the encoded video is "709."

Conversion information outside the codec is described. The description '<SupplementaryDescriptor schemeIdUri="urn: brdcst: video: cvtdynamicrange" value="1"/>' indicates that the dynamic range of the video after conversion is "HDR." The description '<SupplementaryDescriptor schemeIdUri="urn: brdcst: video: cvt-transferfunction" value="2"/>' indicates that the EOTF type of the video after conversion is "PQ." The description '<SupplementaryDescriptor schemeIdUri="urn: brdcst: video: cvtxycolourprimaries" value="1"/>' indicates that the color primary of the video after conversion is "2020." Furthermore, the description '<SupplementaryDescriptor schemeIdUri="urn: brdcst: video: cvtconversion_type" value="0"/>' indicates that the type of metadata used for conversion is "SDR→HDR conversion metadata (ETSI TS 103433-1)."

In this MPD file, a first representation corresponding to the first encoded stream having the encoded image data of each picture of the base layer exists, and a first representation corresponding to the second encoded stream having the encoded image data of each picture of the enhanced layer exists.

In the first representation, the description 'width="1920" height="1080" frameRate="60"', 'codecs="hev1.xx.xx.L123, xx"', 'level="0"' indicates that the stream of HD (2K) 60 P is implemented, the level "0" is given as tag information, and the level of the first encoded stream having the encoded image data of each picture of the base layer is "123." Furthermore, the description '<BaseURL>videostreamBase.mp4</BaseURL>' indicates that the location destination of the first video stream is "videostreamBase.mp4."

Furthermore, in the second representation, the description 'width="3840" height="2160" frameRate="60"', 'codecs="hev1.xx.xx.L153, xx"', 'level="1"', 'dependencyLevel="0"' indicates that the stream of UHD (4K) 60 P is implemented by enhancement on the first encoded stream, the level "1" is given as tag information, and the level of the second encoded stream having the encoded image data of each picture of the enhanced layer is "153." Furthermore, the description '<BaseURL>videostreamEnhanced.mp4</BaseURL>' indicates that the location destination of the first video stream is "videostreamEnhanced.mp4."

Next, the description example of the MPD file of FIG. 22 will be described. The description example of the MPD file corresponds to the first layer decomposition (see FIGS. 4(c) and 17). '<AdaptationSet mimeType="video/mp4" codecs="hev1.xx.xx.L123, xx, hev1.yy.yy.L153, yy"' indicates that the adaptation set (AdaptationSet) for the video stream exits, the video stream is supplied in MP4 file structure, and 123 levels and 153-level HEVC encoded image data exist.

In this MPD file, a first representation corresponding to the first encoded stream having the encoded image data of each picture of the base layer exists, and a first representation corresponding to the second encoded stream having the encoded image data of each picture of the enhanced layer exists.

In the first representation, the description '<SupplementaryDescriptor schemeIdUri="urn: brdcst: video: codeddynamicrange" value="0"/>' indicates that the dynamic range of the encoded video is "SDR." The description '<SupplementaryDescriptor schemeIdUri="urn: brdcst: video: codedtransferfunction" value="0"/>' indicates that the EOTF type of the encoded video is "gamma." The description '<SupplementaryDescriptor schemeIdUri="urn: brdcst: video: codedxycolourprimaries" value="0"/>' indicates that the color primary of the encoded video is "709."

Furthermore, the description 'width="1920" height="1080" frameRate="60"', 'codecs="hev1.xx.xx.L123, xx"', 'level="0"' indicates that the stream of HD (2K) 60 P is implemented, the level "0" is given as tag information, and the level of the first encoded stream having the encoded image data of each picture of the base layer is "123." Furthermore, the description '<BaseURL>videostreamBase.mp4</BaseURL>' indicates that the location destination of the first video stream is "videostreamBase.mp4."

Furthermore, in the second representation, the description '<SupplementaryDescriptor schemeIdUri="urn: brdcst: video: codeddynamicrange" value="1"/>' indicates that the dynamic range of the encoded video is "HDR." The description '<SupplementaryDescriptor schemeIdUri="urn: brdcst: video: codedtransferfunction" value="2"/>' indicates that the EOTF type of the encoded video is "PQ." The description '<SupplementaryDescriptor schemeIdUri="urn: brdcst: video: codedxycolourprimaries" value="1"/>' indicates that the color primary of the encoded video is "2020."

Furthermore, the description 'width="3840" height="2160" frameRate="60"', 'codecs="hev1.xx.xx.L153, xx"', 'level="1"', 'dependencyLevel="0"' indicates that the stream of UHD (4K) 60 P is implemented by enhancement on the first encoded stream, the level "1" is given as tag information, and the level of the second encoded stream having the encoded image data of each picture of the enhanced layer is "153." Furthermore, the description '<BaseURL>videostreamEnhanced.mp4</BaseURL>' indicates that the location destination of the first video stream is "videostreamEnhanced.mp4."

Next, the description example of the MPD file of FIG. 23 will be described. The description example of the MPD file corresponds to the second layer decomposition (see FIGS. 4(d) and 18). '<AdaptationSet mimeType="video/mp4" codecs="hev1.xx.xx.L153, xx, hev1.yy.yy.L156, yy"' indicates that the adaptation set (AdaptationSet) for the video stream exits, the video stream is supplied in MP4 file structure, and 153 levels and 156-level HEVC encoded image data exist.

The description '<SupplementaryDescriptor schemeIdUri="urn: brdcst: video: codeddynamicrange" value="0"/>' indicates that the dynamic range of the encoded video is "SDR." The description '<SupplementaryDescriptor schemeIdUri="urn: brdcst: video: coded-transferfunction" value="0"/>' indicates that the EOTF type of the encoded video is "gamma." The description '<SupplementaryDescriptor schemeIdUri="urn: brdcst: video: codedxycolourprimaries" value="0"/>' indicates that the color primary of the encoded video is "709."

Conversion information outside the codec is described. The description '<SupplementaryDescriptor schemeIdUri="urn: brdcst: video: cvtdynamicrange" value="1"/>' indicates that the dynamic range of the video after conversion is "HDR." The description '<SupplementaryDescriptor schemeIdUri="urn: brdcst: video: cvt-transferfunction" value="2"/>' indicates that the EOTF type of the video after conversion is "PQ." The description '<SupplementaryDescriptor schemeIdUri="urn: brdcst: video: cvtxycolourprimaries" value="1"/>' indicates that the color primary of the video after conversion is "2020." Furthermore, the description '<SupplementaryDescriptor schemeIdUri="urn: brdcst: video: cvtconversion_type" value="0"/>' indicates that the type of metadata used for conversion is "SDR→HDR conversion metadata (ETSI TS 103433-1)."

In this MPD file, a first representation corresponding to the first encoded stream having the encoded image data of each picture of the base layer exists, and a first representation corresponding to the second encoded stream having the encoded image data of each picture of the enhanced layer exists.

In the first representation, the description 'width="3840" height="2160" frameRate="60"', 'codecs="hev1.xx.xx.L153, xx"', 'level="0"' indicates that the stream of UHD (4K) 60 P is implemented, the level "0" is given as tag information, and the level of the first encoded stream having the encoded image data of each picture of the base layer is "153." Furthermore, the description '<BaseURL>videostreamBase.mp4</BaseURL>' indicates that the location destination of the first video stream is "videostreamBase.mp4."

Furthermore, in the second representation, the description 'width="3840" height="2160" frameRate="120"', 'codecs="hev1.xx.xx.L156, xx"', 'level="1"', 'dependencyLevel="0"' indicates that the stream of UHD (4K) 120 P is implemented by enhancement on the first encoded stream, the level "1" is given as tag information, and the level of the second encoded stream having the encoded image data of each picture of the enhanced layer is "156." Furthermore, the description '<BaseURL>videostreamEnhanced.mp4</BaseURL>' indicates that the location destination of the first video stream is "videostreamEnhanced.mp4."

Next, the description example of the MPD file of FIG. 24 will be described. The description example of the MPD file corresponds to the second layer decomposition (see FIGS. 4(e) and 19). '<AdaptationSet mimeType="video/mp4" codecs="hev1.xx.xx.L153, xx, hev1.yy.yy.L156, yy"' indicates that the adaptation set (AdaptationSet) for the video stream exits, the video stream is supplied in MP4 file structure, and 153 levels and 156-level HEVC encoded image data exist.

Conversion information outside the codec is described. The description '<SupplementaryDescriptor schemeIdUri="urn: brdcst: video: cvtdynamicrange" value="1"/>' indicates that the dynamic range of the video after conversion is "HDR." The description '<SupplementaryDescriptor schemeIdUri="urn: brdcst: video: cvt-transferfunction" value="2"/>' indicates that the EOTF type of the video after conversion is "PQ." The description '<SupplementaryDescriptor schemeIdUri="urn: brdcst: video: cvtxycolourprimaries" value="1"/>' indicates that the color primary of the video after conversion is "2020." Furthermore, the description '<SupplementaryDescriptor schemeIdUri="urn: brdcst: video: cvtconversion_type" value="1"/>' indicates that the type of metadata used for conversion is "HDR→HDR-low conversion metadata 1 (SMPTE2094-10)."

In this MPD file, a first representation corresponding to the first encoded stream having the encoded image data of each picture of the base layer exists, and a first representation corresponding to the second encoded stream having the encoded image data of each picture of the enhanced layer exists.

In the first representation, the description '<SupplementaryDescriptor schemeIdUri="urn: brdcst: video: codeddynamicrange" value="0"/>' indicates that the dynamic range of the encoded video is "SDR." The description '<SupplementaryDescriptor schemeIdUri="urn: brdcst: video: codedtransferfunction" value="0"/>' indicates that the EOTF type of the encoded video is "gamma." The description '<SupplementaryDescriptor schemeIdUri="urn: brdcst:

video: codedxycolourprimaries" value="0"/>' indicates that the color primary of the encoded video is "709."

Furthermore, the description 'width="19200" height="1080" frameRate="60", 'codecs="hev1.xx.xx.L123, xx"', 'level="0"' indicates that the stream of HD (2K) 60 P is implemented, the level "0" is given as tag information, and the level of the first encoded stream having the encoded image data of each picture of the base layer is "123." Furthermore, the description '<BaseURL>videostreamBase.mp4</BaseURL>' indicates that the location destination of the first video stream is "videostreamBase.mp4."

Furthermore, in the second representation, the description '<SupplementaryDescriptor schemeIdUri="urn: brdcst: video: codeddynamicrange" value="1"/>' indicates that the dynamic range of the encoded video is "HDR." The description '<SupplementaryDescriptor schemeIdUri="urn: brdcst: video: codedtransferfunction" value="2"/>' indicates that the EOTF type of the encoded video is "PQ." The description '<SupplementaryDescriptor schemeIdUri="urn: brdcst: video: codedxycolourprimaries" value="1"/>' indicates that the color primary of the encoded video is "2020."

Furthermore, the description 'width="3840" height="2160" frameRate="60", 'codecs="hev1.xx.xx.L153, xx"', 'level="1"', 'dependencyLevel="0"' indicates that the stream of UHD (4K) 60 P is implemented by enhancement on the first encoded stream, the level "1" is given as tag information, and the level of the second encoded stream having the encoded image data of each picture of the enhanced layer is "153." Furthermore, the description '<BaseURL>videostreamEnhanced.mp4</BaseURL>' indicates that the location destination of the first video stream is "videostreamEnhanced.mp4."

As described above, in the transmission-reception system 10 shown in FIG. 3, in the MPD file, which is a metafile having meta information regarding the first encoded stream and the second encoded stream, the function enhancement information inside the codec (scalable encode information) and the function enhancement information outside the codec (conversion information) are described. Therefore, the reception side can easily acquire this information from the MPD file, and on the basis of the information, the reception side can appropriately perform function enhancement processing inside the codec and function enhancement processing outside the codec according to the display capability.

<2. Modification>

Note that the above embodiment has shown an example in which the container is MP4 (ISOBMFF). However, the present technology is not limited to the MP4 container, and is similarly applicable to containers of other formats such as MPEG-2 TS or MMT.

For example, in a case of MPEG-2 TS, in the container encoder 104 of the service transmission system 100 shown in FIG. 5, a transport stream including the first encoded stream and the second encoded stream is generated.

At this time, in the container encoder 104, a newly defined multidimension_descriptor having the function enhancement information inside the codec (scalable encode information) and the function enhancement information outside the codec (conversion information) in a similar manner to the above MPD file is inserted into a video elementary stream loop corresponding to each encoded stream in a program map table (PMT).

FIG. 26 shows a structure example (syntax) of the multidimension_descriptor. Meanwhile, FIG. 27 shows contents of main information (semantics) in the structure example.

The 8-bit field of "multidimension_descriptor_tag" indicates a descriptor type, and indicates multidimension_descriptor here. The 8-bit field of "multidimension_descriptor_length" indicates the length (size) of the descriptor, and indicates the number of subsequent bytes as the length of the descriptor.

The 8-bit field of "profile_idc" indicates the profile of encoding, and indicates a value that depends on the specification of the encoding scheme. The 8-bit field of "level_idc" indicates the level of encoding, and indicates a value that depends on the specification of the encoding scheme. The 8-bit field of "resolution" indicates the resolution of the encoded image. For example, "0" indicates 640 (H)*480 (V), "1" indicates 1920 (H)*1080 (V), "2" indicates 3840 (H)*2160 (V), and "3" indicates 7680 (H)*4320 (V).

The 8-bit field of "frame_rate" indicates the frame rate of the encoded image. For example, "0" indicates 24 Hz, "1" indicates 25 Hz, "2" indicates 29.97 Hz, "3" indicates 30 Hz, "4" indicates 50 Hz, and "5" indicates 59.94 Hz. "6" indicates 60 Hz, "7" indicates 100 Hz, "8" indicates 119.88 Hz, and "9" indicates 120 Hz. The 8-bit field of "bitdepth" indicates the bit depth of a component of the encode image. For example, "0" indicates 8 bits and "1" indicates 10 bits.

The 8-bit field of "codeddynamicrange" indicates dynamic range information of the encoded video. For example, "0" indicates SDR and "1" indicates HDR. The 8-bit field of "codedtransferfunction" indicates the EOTF type of the encoded video. For example, "0" indicates gamma, "1" indicates HLG, and "2" indicates PQ. The 8-bit field of "codedxycolourprimaries" indicates the color primary of the encoded video. For example, "0" indicates 709 and "1" indicates 2020.

The 1-bit field of "external_conversion_flag" is a flag indicating whether meta information to be converted outside the codec is included. For example, "0" indicates that conversion meta is not included, and "1" indicates that conversion meta is included. When "external_conversion_flag" is "1", respective 8-bit fields of "cvtdynamicrange", "cvttransferfunction", "cvtxycolourprimaries", and "conversion_type" exist.

The 8-bit field of "cvtdynamicrange" indicates dynamic range information of the video after conversion. For example, "0" indicates SDR and "1" indicates HDR. The 8-bit field of "cvttransferfunction" indicates the EOTF type of the encoded video. For example, "0" indicates gamma, "1" indicates HLG, and "2" indicates PQ. The 8-bit field of "cvtxycolourprimaries" indicates the color primary of the encoded video. For example, "0" indicates 709 and "1" indicates 2020.

The 8-bit field of "cvtconversion_type" indicates the type of metadata used for conversion (conversion metadata). For example, "0" indicates "SDR->HDR conversion metadata (ETSI TS 103433-1)", "1" indicates "HDR->Non-HDR conversion metadata 1 (SMPTE2094-10)", and "2" indicates "HDR->Non-HDR conversion metadata 2 (SMPTE2094-40)."

Furthermore, the 8-bit field of "layer_level" indicates a layer value of the encoded stream. For example, "0" indicates the base layer and "1" indicates the enhanced layer. The 8-bit field of "dependency_level" indicates a layer value of the stream that is directly referred to (layer_level) in a case of an encoded stream other than the base layer.

Figure 28:
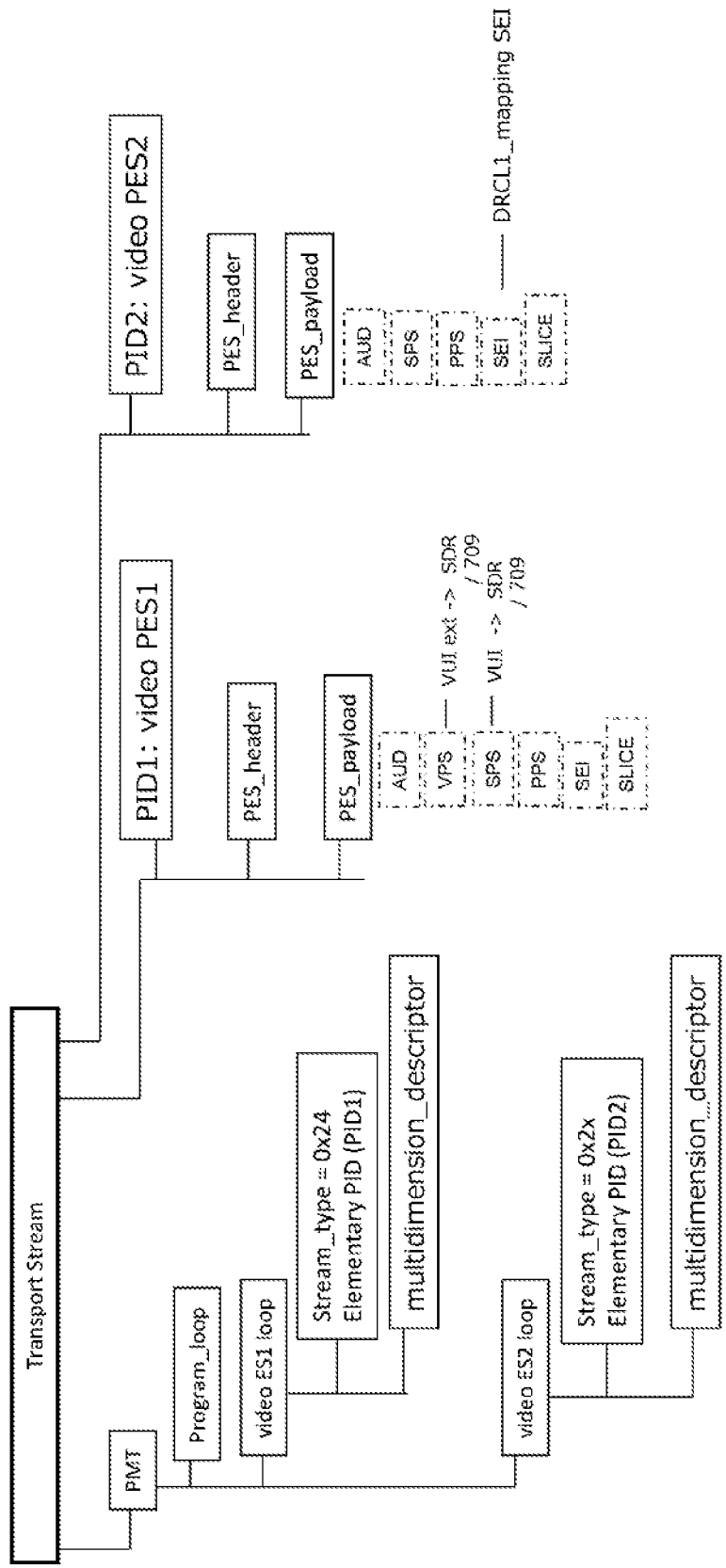
FIG. 28 is a diagram showing a configuration example of a transport stream in a case where conversion to HDR/color gamut is performed outside the codec.

FIG. 28 shows a configuration example of the transport stream in a case where conversion to HDR/color gamut is performed outside the codec (corresponding to the second and fourth layer decomposition described above). In this configuration example, a PES packet "video PES1" of the video stream identified by PID1 and a PES packet "video PES2" of the video stream identified by PID2 exist.

The payload of the PES packet "video PES1" includes the access unit of each picture of the base layer (encoded image data). The payload of the PES packet "video PES2" includes the access unit of each picture of the enhanced layer (encoded image data).

In the access unit (encoded image data) contained in the PES packet "video PES1", "VUI" of "SPS" indicates information of the dynamic range/color gamut of the base layer, which is SDR/709 here. Meanwhile, "VUIext" of "VPS" indicates information of the dynamic range/color gamut of the base layer, which is SDR/709 here.

Furthermore, in the access unit (encoded image data) of each picture contained in the PES packet "video PES2", as one SEI message, the SEI message including the metadata "DRCL1_mapping" for converting the dynamic range from SDR to HDR (see FIG. 8(a)) is inserted into "SEI." This SEI message converts SDR after decoding into HDR, and the HDR receiver performs conversion into HDR for display. The SDR receiver can ignore this SEI message.

Furthermore, the video elementary stream loop (video ES loop) corresponding to the base video stream "video PES1" and the enhanced video stream "video PES2" exists in PMT. In the video elementary stream loop (video ES loop), corresponding to the video streams, information such as the stream type or PID (packet identifier) is placed, and a descriptor describing information related to the video streams is also placed.

In the "video ES1 loop", corresponding to the base video stream (video PES1), information such as the stream type or packet identifier (PID) is placed, and the descriptor describing information related to the video stream is also placed. This stream type is "0x24" indicating the base video stream. Furthermore, as one descriptor, the multidimension_descriptor is inserted (see FIG. 26).

Furthermore, in the "video ES2 loop", corresponding to the enhanced video stream (video PES2), information such as the stream type or packet identifier (PID) is placed, and the descriptor describing information related to the video stream is also placed. This stream type is "0x2x" indicating the enhanced video stream. Furthermore, as one descriptor, the multidimension_descriptor is inserted (see FIG. 26).

Figure 29:
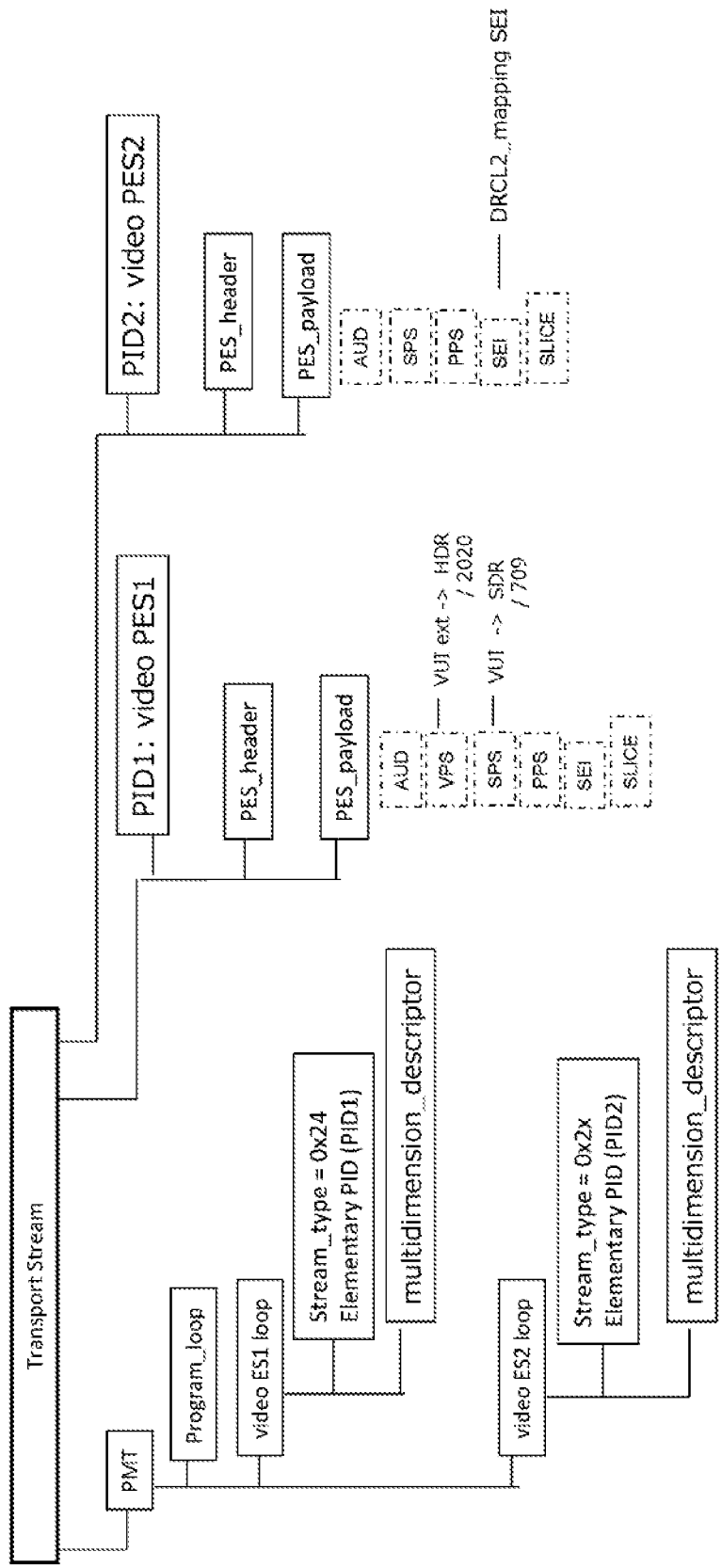
FIG. 29 is a diagram showing a configuration example of the transport stream in a case where HDR/color gamut scalable is performed inside the codec.

FIG. 29 shows a configuration example of the transport stream in a case where HDR/color gamut scalable is performed inside the codec (corresponding to the first, third, and fifth layer decomposition described above). In this configuration example, a PES packet "video PES1" of the video stream identified by PID1 and a PES packet "video PES2" of the video stream identified by PID2 exist.

The payload of the PES packet "video PES1" includes the access unit of each picture of the base layer (encoded image data). The payload of the PES packet "video PES2" includes the access unit of each picture of the enhanced layer (encoded image data).

In the access unit (encoded image data) contained in the PES packet "video PES1", "VUI" of "SPS" indicates information of the dynamic range/color gamut of the base layer, which is SDR/709 here. Meanwhile, "VUIext" of "VPS" indicates information of the dynamic range/color gamut of the base layer, which is HDR/2020 here.

Furthermore, in the access unit (encoded image data) of each picture contained in the PES packet "video PES2", as one SEI message, the SEI message including the metadata "DRCL2_mapping" for converting the dynamic range from HDR to HDR-low (see FIG. 8(b)) is inserted into "SEI." This SEI message converts HDR after decoding into HDR-low, and the HDR-low receiver performs conversion into HDR-low for display. The HDR receiver can ignore this SEI message.

Furthermore, the video elementary stream loop (video ES loop) corresponding to the base video stream "video PES1" and the enhanced video stream "video PES2" exists in PMT. In the video elementary stream loop (video ES loop), corresponding to the video streams, information such as the stream type or PID (packet identifier) is placed, and a descriptor describing information related to the video streams is also placed.

In the "video ES1 loop", corresponding to the base video stream (video PES1), information such as the stream type or packet identifier (PID) is placed, and the descriptor describing information related to the video stream is also placed. This stream type is "0x24" indicating the base video stream. Furthermore, as one descriptor, the multidimension_descriptor is inserted (see FIG. 26).

Furthermore, in the "video ES2 loop", corresponding to the enhanced video stream (video PES2), information such as the stream type or packet identifier (PID) is placed, and the descriptor describing information related to the video stream is also placed. This stream type is "0x2x" indicating the enhanced video stream. Furthermore, as one descriptor, the multidimension_descriptor is inserted (see FIG. 26).

Furthermore, for example, in a case of MMT, in the container encoder 104 of the service transmission system 100 shown in FIG. 5, an MMT stream including the first encoded stream and the second encoded stream is generated.

At this time, in the container encoder 104, a newly defined multidimension_descriptor having the function enhancement information inside the codec (scalable encode information) and the function enhancement information outside the codec (conversion information) in a similar manner to the above MPD file is inserted into a video asset loop corresponding to the enhanced video stream in a MMT package table (MPT).

Figure 30:
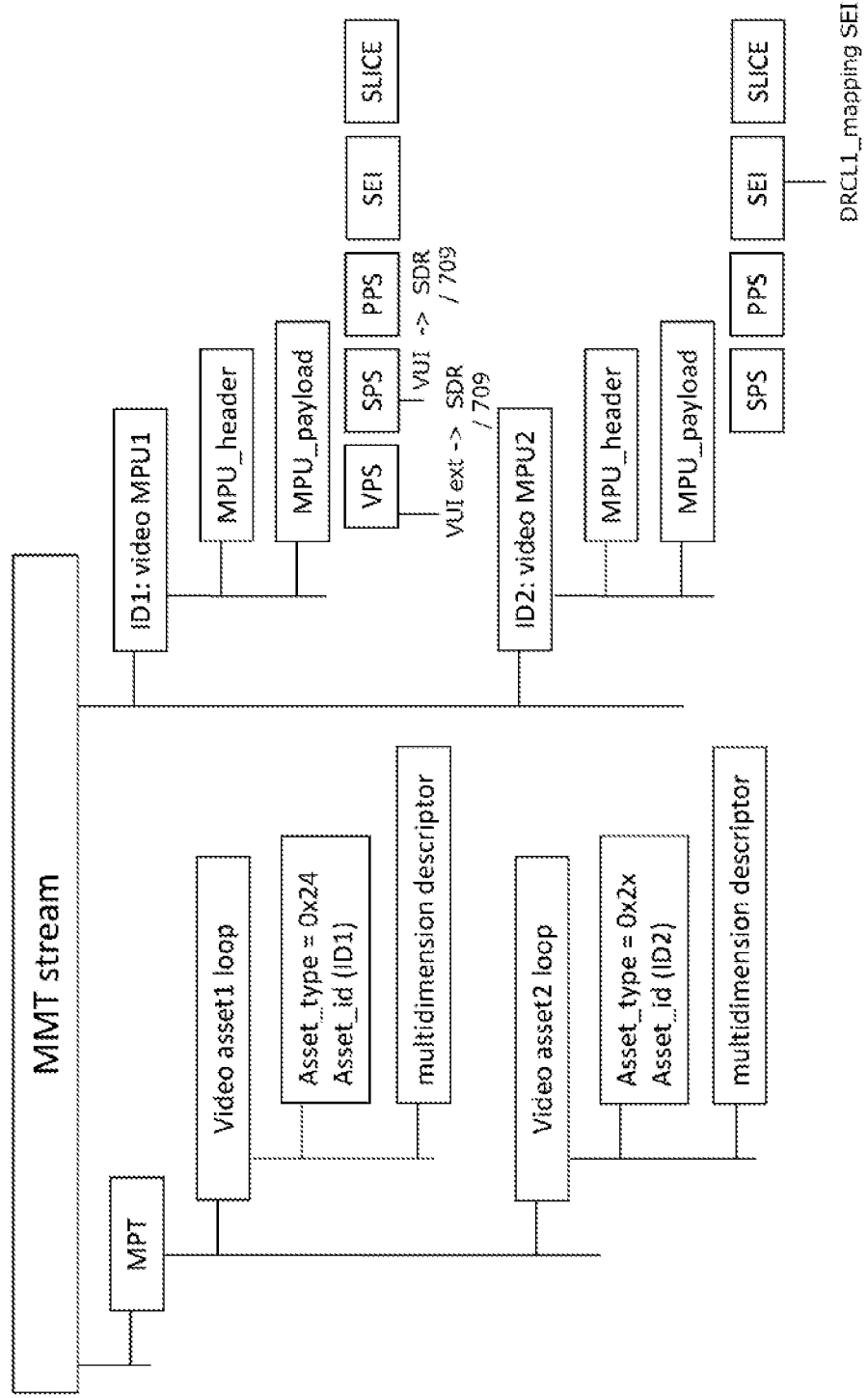
FIG. 30 is a diagram showing a configuration example of an MMT stream in a case where conversion to HDR/color gamut is performed outside the codec.

FIG. 30 shows a configuration example of the MMT stream in a case where conversion to HDR/color gamut is performed outside the codec (corresponding to the second and fourth layer decomposition described above). In this configuration example, an MPU packet "video MPU1" of the video stream identified by ID1 and an MPU packet "video MPU2" of the video stream identified by PID2 exist.

The payload of the MPU packet "video MPU1" includes the access unit of each picture of the base layer (encoded image data). The payload of the MPU packet "video MPU2" includes the access unit of each picture of the enhanced layer (encoded image data).

In the access unit (encoded image data) contained in the MPU packet "video MPU1", "VUI" of "SPS" indicates information of the dynamic range/color gamut of the base layer, which is SDR/709 here. Meanwhile, "VUIext" of "VPS" indicates information of the dynamic range/color gamut of the base layer, which is SDR/709 here.

Furthermore, in the access unit (encoded image data) of each picture contained in the MPU packet "video MPU2", as one SEI message, the SEI message including the metadata "DRCL1_mapping" for converting the dynamic range from SDR to HDR (see FIG. 8(a)) is inserted into "SEI." This SEI message converts SDR after decoding into HDR, and the HDR receiver performs conversion into HDR for display. The SDR receiver can ignore this SEI message.

Furthermore, the video asset loop corresponding to the base video stream "video MPU1" and the enhanced video stream "video MPU2" exists in MPT. In the video asset loop, corresponding to the video stream, information such as the asset type or asset ID is placed, and the descriptor describing information related to the video stream is also placed.

In the "video asset1 loop", corresponding to the base video stream (video MPU1), information such as the stream type or packet identifier (PID) is placed, and the descriptor describing information related to the video stream is also placed. This asset type is "0x24" indicating the base video stream. Furthermore, as one descriptor, the multidimension_descriptor is inserted (see FIG. 26).

Furthermore, in the "video ES2 loop", corresponding to the enhanced video stream (video MPU2), information such as the asset type or asset ID is placed, and the descriptor describing information related to the video stream is also placed. This asset type is "0x2x" indicating the enhanced video stream. Furthermore, as one descriptor, the multidimension_descriptor is inserted (see FIG. 26).

Figure 31:
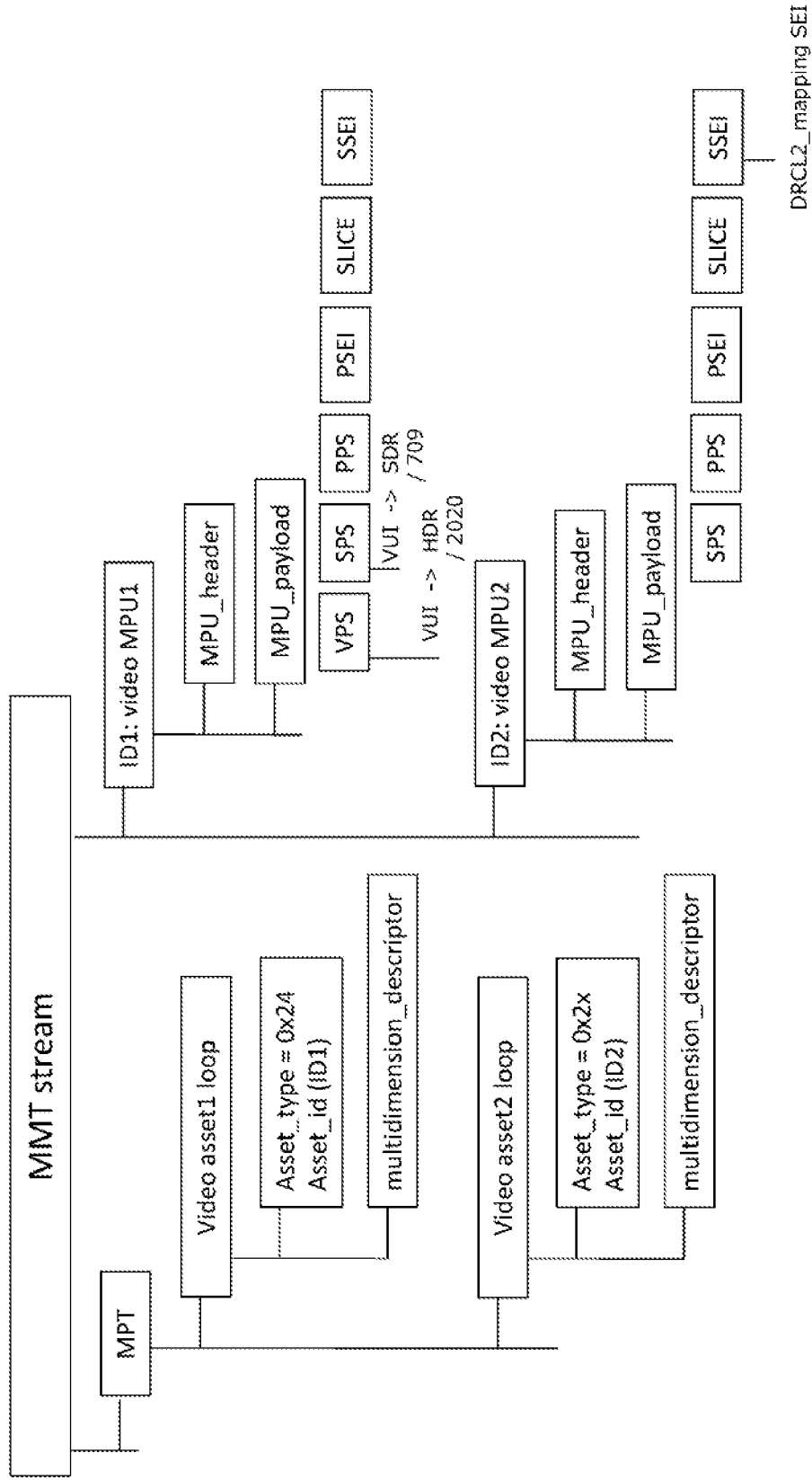
FIG. 31 is a diagram showing a configuration example of the MMT stream in a case where HDR/color gamut scalable is performed inside the codec.

FIG. 31 shows a configuration example of the MMT stream in a case where HDR/color gamut scalable is performed inside the codec (corresponding to the first, third, and fifth layer decomposition described above). In this configuration example, an MPU packet "video MPU1" of the video stream identified by ID1 and an MPU packet "video MPU2" of the video stream identified by PID2 exist.

The payload of the MPU packet "video MPU1" includes the access unit of each picture of the base layer (encoded image data). The payload of the MPU packet "video MPU2" includes the access unit of each picture of the enhanced layer (encoded image data).

In the access unit (encoded image data) contained in the MPU packet "video MPU1", "VUI" of "SPS" indicates information of the dynamic range/color gamut of the base layer, which is SDR/709 here. Meanwhile, "VUIext" of "VPS" indicates information of the dynamic range/color gamut of the base layer, which is HDR/2020 here.

Furthermore, in the access unit (encoded image data) of each picture contained in the MPU packet "video MPU2", as one SEI message, the SEI message including the metadata "DRCL2_mapping" for converting the dynamic range from HDR to HDR-low (see FIG. 8(b)) is inserted into "SEI." This SEI message converts SDR after decoding into HDR, and the HDR receiver performs conversion into HDR for display. The SDR receiver can ignore this SEI message.

Furthermore, the video asset loop corresponding to the base video stream "video MPU1" and the enhanced video stream "video MPU2" exists in MPT. In the video asset loop, corresponding to the video stream, information such as the asset type or asset ID is placed, and the descriptor describing information related to the video stream is also placed.

In the "video asset1 loop", corresponding to the base video stream (video MPU1), information such as the stream type or packet identifier (PID) is placed, and the descriptor describing information related to the video stream is also placed. This asset type is "0x24" indicating the base video stream. Furthermore, as one descriptor, the multidimension_descriptor is inserted (see FIG. 26).

Furthermore, in the "video ES2 loop", corresponding to the enhanced video stream (video MPU2), information such as the asset type or asset ID is placed, and the descriptor describing information related to the video stream is also placed. This asset type is "0x2x" indicating the enhanced video stream. Furthermore, as one descriptor, the multidimension_descriptor is inserted (see FIG. 26).

Furthermore, in the above embodiment, the transmission-reception system 10 including the transmission device 100 and the reception device 200 has been shown. However, the configuration of the transmission-reception system to which the present technology is applicable is not limited to this configuration. For example, part of the reception device 200 may be a configuration of a set top box and a monitor connected via a digital interface such as (high-definition multimedia interface (HDMI)), or the like. Note that "HDMI" is a registered trademark.

Furthermore, the present technology can also have the following configurations.

(1) A transmission device including:

an image encoding unit configured to encode image data of each picture of a base layer to generate a first encoded stream, and to encode image data of each picture of an enhanced layer to generate a second encoded stream;

a stream transmission unit configured to transmit the first encoded stream and the second encoded stream; and an information transmission unit configured to transmit, outside the encoded stream, function enhancement information including at least function enhancement information inside a codec.

(2) The transmission device according to the (1), in which the function enhancement information further includes function enhancement information outside the codec.

(3) The transmission device according to the (2), in which the function enhancement information outside the codec includes information regarding conversion of a dynamic range and a color gamut.

(4) The transmission device according to the (3), further including an information insertion unit configured to insert the conversion information of the dynamic range and the color gamut into the second encoded stream.

(5) The transmission device according to any one of the (1) to (4), in which the information transmission unit inserts the function enhancement information into a layer of a container including the first encoded stream and the second encoded stream for transmission.

(6) The transmission device according to the (5), in which the container includes MPEG2-TS, and the information transmission unit inserts the function enhancement information into a program map table for transmission.

(7) The transmission device according to the (5), in which the container includes an MMT stream, and the information transmission unit inserts the function enhancement information into an MMT package table for transmission.

(8) The transmission device according to any one of the (1) to (4), in which the information transmission unit inserts the function enhancement information into a metafile having meta information regarding the first encoded stream and the second encoded stream for transmission.

(9) The transmission device according to the (8), in which the metafile includes an MPD file.

(10) A transmission method including:

an image encoding step of, by an image encoding unit, encoding image data of each picture of a base layer to generate a first encoded stream, and encoding image data of each picture of an enhanced layer to generate a second encoded stream;

a stream transmission step of, by a stream transmission unit, transmitting the first encoded stream and the second encoded stream; and an information transmission step of, by an information transmission unit, transmitting, outside the encoded stream, function enhancement information including at least function enhancement information inside a codec.

(11) A reception device including:
a stream reception unit configured to receive a first encoded stream generated by encoding image data of each picture of a base layer, and a second encoded stream generated by encoding image data of each picture of an enhanced layer;
an information reception unit configured to receive function enhancement information including at least function enhancement information inside a codec, the function enhancement information being sent outside the encoded stream; and
a processing unit configured to process the first encoded stream and the second encoded stream on the basis of the function enhancement information.

(12) The reception device according to the (11),
in which the function enhancement information further includes function enhancement information outside the codec.

(13) The reception device according to the (12),
in which the function enhancement information outside the codec includes information regarding conversion of a dynamic range and a color gamut.

(14) A reception method including:
a stream reception step of, by a stream reception unit, receiving a first encoded stream generated by encoding image data of each picture of a base layer, and a second encoded stream generated by encoding image data of each picture of an enhanced layer;
an information reception step of, by an information reception unit, receiving function enhancement information including at least function enhancement information inside a codec, the function enhancement information being sent outside the encoded stream; and
a processing step of, by a processing unit, processing the first encoded stream and the second encoded stream on the basis of the function enhancement information.

The main feature of the present technology is that, by sending, outside the encoded stream, the function enhancement information inside the codec (scalable encode information) and the function enhancement information outside the codec (conversion information), the reception side can easily acquire the function enhancement information inside the codec or outside the codec, and on the basis of this information, making it possible to perform function enhancement processing appropriately according to the display capability (see FIGS. 20 to 24, 26, 28 to 31).

REFERENCE SIGNS LIST

10 Transmission-reception system
100 Service transmission system
101 Controller
102 HDR opto-electronic conversion unit
103 Video encoder
104 Container encoder
111 Conversion unit
112 Base layer encoder
113 Base layer decoded picture buffer
114 Enhanced layer encoder
115 Enhanced layer decoded picture buffer
116 Color remapping table
117 Inter layer prediction circuit
121 Conversion unit
122 Upsampling filter
123 Conversion unit
124 Conversion unit
125 Hierarchical layer prediction circuit
200 Service receiver
201 Controller
202 Container decoder
203 Video decoder
204 Converter
205 Electro-optical conversion unit
211 Base layer decoder
212 Base layer decoded picture buffer
213 Enhanced layer decoder
214 Enhanced layer decoded picture buffer
215 Color remapping table
216 Inter layer prediction circuit
221 Upsampling filter
222 Conversion unit
223 Hierarchical layer prediction circuit
224 Conversion unit

The invention claimed is:

1. A transmission device, comprising:
processing circuitry configured to:
encode image data of each picture of a base layer to generate a first encoded stream;
encode image data of each picture of an enhanced layer to generate a second encoded stream;
generate a container that includes the first encoded stream, the second encoded stream, layer information, and dynamic range metadata, the dynamic range metadata inserted into a layer of the container outside the first encoded stream and the second encoded stream,
the layer information being for generating enhanced image data based on the first encoded stream and the second encoded stream, and
the dynamic range metadata including dynamic range conversion information for converting a dynamic range of the enhanced image data, and
transmission circuitry configured to transmit the container.

2. The transmission device according to claim 1 wherein the processing circuitry is further configured to: insert the layer information into the first encoded stream or the second encoded stream.

3. The transmission device according to claim 1, wherein the dynamic range metadata further includes color gamut information for converting a color gamut of the enhanced image data.

4. The transmission device according to claim 1, wherein the dynamic range conversion information includes conversion type information indicating a type of dynamic range conversion.

5. The transmission device according to claim 1, wherein the dynamic range of the enhanced image data is standard dynamic range (SDR), and the dynamic range of the enhanced image data is converted from the SDR to high dynamic range (HDR) on a basis of the dynamic range metadata.

6. A reception device, comprising:
reception circuitry configured to receive a container that includes a first encoded stream, a second encoded stream, layer information, and dynamic range metadata,
the first encoded stream including encoded image data of each picture of a base layer,
the second encoded stream including encoded image data of each picture of an enhanced layer, the layer information being for generating enhanced image data based on the first encoded stream and the second encoded stream, and the dynamic range metadata including dynamic range conversion information for converting a dynamic range of the enhanced image data; and processing circuitry configured to:

generate the enhanced image data according to the first encoded stream and the second encoded stream on a basis of the layer information; and convert the dynamic range of the enhanced image data on a basis of the dynamic range metadata, wherein the dynamic range metadata is inserted into a layer of the container outside the first encoded stream and the second encoded stream.

7. The reception device according to claim 6, wherein the layer information is inserted into the first encoded stream or the second encoded stream.

8. The reception device according to claim 6, wherein the dynamic range metadata further includes color gamut information for converting a color gamut of the enhanced image data.

9. The reception device according to claim 6, wherein the dynamic range conversion information includes conversion type information indicating a type of dynamic range conversion.

10. The reception device according to claim 6, wherein the dynamic range of the enhanced image data is standard dynamic range (SDR), and the processing circuitry configured to convert the dynamic range of the enhanced image data from the SDR to high dynamic range (HDR) on the basis of the dynamic range metadata.

11. A reception method, comprising:

receiving, by reception circuitry of a reception device, a container that includes a first encoded stream, a second encoded stream, layer information, and dynamic range metadata, the first encoded stream including encoded image data of each picture of a base layer, the second encoded stream including encoded image data of each picture of an enhanced layer, the layer information being for generating enhanced image data based on the first encoded stream and the second encoded stream, and the dynamic range metadata including dynamic range conversion information for converting dynamic range of the enhanced image data;

generating the enhanced image data according to the first encoded stream and the second encoded stream on a basis of the layer information; and converting the dynamic range of the enhanced image data on a basis of the dynamic range metadata, wherein the dynamic range metadata is inserted into a layer of the container outside the first encoded stream and the second encoded stream.

12. The reception method according to claim 11, wherein the dynamic range of the enhanced image data is standard dynamic range (SDR), and converting the dynamic range of the enhanced image data from the SDR to high dynamic range (HDR) on the basis of the dynamic range metadata.

* * * * *